United States Patent
Tian et al.

(10) Patent No.: US 8,116,223 B2
(45) Date of Patent: Feb. 14, 2012

(54) SYSTEM AND METHOD FOR SUPPORTING AUTOMATIC ESTABLISHING AND DISCONNECTING SEVERAL WIRELESS CONNECTIONS

(75) Inventors: Dan Tian, Beijing (CN); Yuefang He, Beijing (CN)

(73) Assignee: IVT Technology Inc., Bejing (CN)

( * ) Notice: Subject to any disclaimer, the term of this patent is extended or adjusted under 35 U.S.C. 154(b) by 5 days.

(21) Appl. No.: 12/514,227

(22) PCT Filed: Nov. 8, 2007

(86) PCT No.: PCT/CN2007/003173
§ 371 (c)(1),
(2), (4) Date: May 8, 2009

(87) PCT Pub. No.: WO2008/055418
PCT Pub. Date: May 15, 2008

(65) Prior Publication Data
US 2010/0195539 A1    Aug. 5, 2010

(51) Int. Cl.
*H04L 12/26* (2006.01)
(52) U.S. Cl. ........ 370/252; 370/254; 370/328; 370/338; 455/518; 455/560
(58) Field of Classification Search ........................ None
See application file for complete search history.

(56) References Cited

U.S. PATENT DOCUMENTS

| | | | |
|---|---|---|---|
| 6,711,611 B2 | 3/2004 | Hanhan | |
| 7,266,383 B2 * | 9/2007 | Anderson | 455/518 |
| 7,469,139 B2 * | 12/2008 | van de Groenendaal | 455/411 |
| 7,545,771 B2 * | 6/2009 | Wentink et al. | 370/329 |
| 7,814,322 B2 * | 10/2010 | Gurevich et al. | 713/171 |
| 7,940,744 B2 * | 5/2011 | Lehotsky et al. | 370/351 |
| 7,961,690 B2 * | 6/2011 | Nagarajan et al. | 370/338 |
| 2004/0057411 A1 | 3/2004 | Straub et al. | |
| 2004/0242223 A1 | 12/2004 | Burklin et al. | |
| 2006/0079181 A1 | 4/2006 | Yun et al. | |
| 2007/0189269 A1 | 8/2007 | Ho et al. | |
| 2007/0211649 A1 * | 9/2007 | Hauenstein et al. | 370/254 |
| 2007/0243902 A1 * | 10/2007 | Puschel et al. | 455/560 |
| 2010/0124196 A1 * | 5/2010 | Bonar et al. | 370/329 |

FOREIGN PATENT DOCUMENTS

CN    1859516 A    11/2006

OTHER PUBLICATIONS

Written Opinion of the International Searching Authority No. PCT/CN2007/003173 Mar. 6, 2008 (4 pages).

* cited by examiner

*Primary Examiner* — Michael J Moore, Jr.
(74) *Attorney, Agent, or Firm* — Nutter McClennen & Fish LLP; Thomas J. Engellenner

(57) ABSTRACT

A method for automatically establishing wireless connections between a plurality of grouped wireless devices and a third party wireless device, comprising the steps of: forming a connection group having a first wireless device and at least one additional grouped wireless device; configuring a connection table to record connection group attribute parameters for the connection group, the connection group attribute parameters including connection parameters of said first wireless device and other grouped wireless devices; configuring the first wireless device in the connection group such that it is capable of establishing a wireless connection with a third party wireless device; and establishing an additional wireless connection between the third party wireless device and the wireless devices of the group if the additional wireless connection satisfies a connection parameter specified by the connection table in the connection group.

18 Claims, 14 Drawing Sheets

[<00:0E:6D:70:F0:01, A2DP, SNK>,
<00:0E:6D:70:F0:02, A2DP, SNK>,
<00:0E:6D:70:F0:03, A2DP, SNK>,
<00:0E:6D:70:F0:04, A2DP, SNK>,
<00:0E:6D:70:F0:05, A2DP, SNK>]

SYSTEM AND METHOD FOR SUPPORTING AUTOMATIC ESTABLISHING AND DISCONNECTING SEVERAL WIRELESS CONNECTIONS

TECHNICAL FIELD

The present invention relates to wireless communication technology, in particular to a system and method for supporting automatically establishing and disconnecting several wireless connections.

BACKGROUND ART

Many different kinds of wireless technology, such as Bluetooth technology, WiFi technology, Wibree technology, wireless USB technology and UWB technology, increase rapidly in recent years and have been applied extensively in our daily life and work. Wireless technology helps users to extricate from troubled cable application, however, it also brings a problem that the users need to manually operate and handle wireless connections during the process of establishing and disconnecting connections.

Taking Bluetooth technology as an example, each of Bluetooth devices has a global unique Bluetooth device address (BD_ADDR) to identify oneself from others. The function of one Bluetooth device is provided to another Bluetooth device in a manner of Bluetooth service. One Bluetooth device may provide several Bluetooth services simultaneously. Users may select a certain service therefrom to make a connection according to needs, each Bluetooth service corresponds to an application profile in the upper layer of the Bluetooth protocol stack, we usually call this as application connection. With regard to two devices between which the connection of a certain application connection type has been established, the Bluetooth specification defines different application connection roles respectively. For example, there are two roles defined in an Advanced Audio Distribution Profile (A2DP) connection, a source (SRC) and a Sink (SNK) of audio data, wherein the SRC transmits an audio stream, and the SNK receives an audio stream; there are two roles defined in an Audio/Video Remote Control Profile (AVRCP) connection, a Controller (CT) and a Target (TG), wherein the CT can transmit a control command to the TG to remotely control the TG; in a Bluetooth Personal Area Network (PAN) application connection, two or more Bluetooth devices form a temporary Group Ad-doc Network (GN) or access to a remote network via a Network Access Point (NAP), the Bluetooth device employing NAP service or GN service is called as PAN User (PANU), therefore, the two roles of PAN application connection are NAP/GN and (PANU) respectively; there are two roles defined in the Human Interface Device (HID) application connection, a Host and a Device, the Device may serve as an input and a control device of the Host; there are two roles in a Bluetooth Hand Free Profile (HFP) connection, an Audio Gateway (AG) and a Hand Free (HF), wherein the AG refers to a gateway device of audio input and output, such as a cellular mobile phone, whereas the HF refers to a device able to remotely control the AG such as a hand-free headset embedded in a car.

Taking Wireless Fidelity (WiFi) technology as another example. WiFi is an industrial standard (IEEE802.11) of wireless network communication defined by IEEE. The communication between two WiFi devices can be carried out not only in an ad-hoc manner, but also under the coordination of a Base Station (BS) or Access Point (AP). A WiFi device identifies itself from other WiFi devices with its global unique Media Access Control (MAC) address. Different from Bluetooth technology, WiFi only defines a MAC layer and a physical layer without an upper application model. Therefore, WiFi does not have the application connections corresponding to different services, and naturally does not have the roles corresponding to application connections.

The connecting manners of Ultra Wideband (UWB) technology and Wibree technology are substantially similar to the connecting manner of Bluetooth technology in the physical layer and the link layer, they all have a MAC address, a bottom layer physical wireless connection and a upper layer application connection.

At present, with an increase of wireless devices, there gradually appears a scene in which a plurality of wireless devices need to be used in cooperation, such as a wireless mouse and wireless keyboard, a wireless remote controller and wireless headset, a wireless multi-channel sound box, and etc. The users generally need to select several services in such application scene, therefore, several wireless connections shall be established. This requires the users to handle these connections respectively through manual operation. When the users finish using, however, they also need to manually disconnect the established connections one by one respectively. This task is repetitive and tedious to users and takes lots of time and efforts.

In addition, a wireless product always provides several kinds of services, for example, some Bluetooth smart phones provide not only Bluetooth audio and PAN function but also specific remote control function. Furthermore, some wireless products can support various kinds of wireless technologies as well, such as the wireless combination product of WiFi/Bluetooth, these wireless technologies have different advantages and disadvantages in the aspects of bandwidth, signal quality and power consumption. At the same time of providing the users with more services and more choices, these multi-functional wireless products and wireless combination products also require the users to select and establish suitable wireless connections according to their own needs. However, the users are usually lack of necessary professional technical knowledge, when facing different wireless applications, they possibly need to manually configure parameters or operate to process several wireless connections, at this time the users often feel difficult to set and inconvenient to operate. All these problems bring the users an experience of suboptimization.

SUMMARY OF THE INVENTION

In consideration of the defects existing in the prior art, it needs to provide a manner in which several wireless connections can be automatically established and disconnected according to users' needs.

According to the present invention, a system and method for supporting automatically establishing and disconnecting several wireless connections are provided to make at least two wireless devices form a connection group and to perform bundling of establishing and disconnecting connections on specific services of several wireless devices. As long as a third party wireless device performs establishing or disconnecting connections of the bundled specific services with a group wireless device in the connection group, then other group wireless devices in the connection group automatically establishes or disconnects connections of the bundled specific services with the third party wireless device.

According to an aspect of the invention, a method for supporting automatically establishing or disconnecting several wireless connections between several group wireless devices and a third party wireless device is set forth, comprising the steps of: forming a connection group and selecting the group first wireless device and other several group wireless devices that are going to join in this connection group; configuring a connection table to record connection group attribute parameters for the connection group, the connection group attribute parameters including the connection parameters of said group first wireless device and other plurality of group wireless devices; the group first wireless device storing the connection table in the connection group establishing/disconnecting a wireless connection with the third party wireless device, when the wireless connection has the connection parameters of said group first wireless device as specified by the connection table in the connection group, according to other connection parameters included in the connection group attribute parameters, automatically establishing/disconnecting a corresponding wireless connection between the third party wireless device and other group wireless devices in said connection group.

According to the invention, two or more wireless devices are combined to form a connection group through configuring a connection table. Therefore, the connection parameters in said connection group attribute parameters include the connection addresses of respective group wireless devices, the corresponding application connection types and roles in the connection group. If the wireless technologies supported by at least two wireless devices in the connection group are different, or some of the wireless devices are combined devices supporting several kinds of wireless functions, preferably, the attribute parameters (including Bluetooth technology, WiFi technology, Wibree technology, wireless USB technology, UWB technology and the like) of wireless connection type are further added in the connection table for marking the wireless connection types selected by respective group wireless devices in the corresponding connection group. For example, if two group wireless devices in the connection group are a wireless USB mouse and a Bluetooth keyboard respectively, when configuring the connection table, the wireless connection type of the wireless USB mouse is then labeled as wireless USB, and the wireless connection type of the Bluetooth keyboard is labeled as Bluetooth; if there is a combined WiFi/Bluetooth device supporting WiFi and Bluetooth wireless functions in the connection group, the wireless connection type of this WiFi/Bluetooth wireless combination product in the corresponding connection group is labeled as Bluetooth or WiFi in the connection table. When a wireless connection type is not labeled in the connection table, it is allowed to take the wireless connection type of the wireless device that first establishes a connection with the third party wireless device in the connection group as the default wireless connection type of other wireless devices in the connection group.

At the same time, if connection authentication is required when the group wireless device establishes a connection with the third party wireless device, preferably the attribute parameters of connection authentication default parameters of respective group wireless devices and the third party wireless device are further added in the connection table. In this way, respective group wireless devices and the third party wireless device can automatically perform connection authentication according to connection authentication default parameters in the connection table, the users do not need to manually input connection authentication parameters in respective group wireless devices and the third party wireless device time and time again, thus improving the efficiency.

In a preferable embodiment of the invention, said connection table is configured and stored by the group first wireless device in the connection group, comprising: the group first wireless device selects a certain one or several other wireless devices from the peripheral wireless devices as looked up according to a certain criteria and combines itself with the selected wireless device(s) to form a certain connection group; moreover, the group first wireless device establishes a connection table and adds the supported connection parameters to connection group attribute parameters of the connection group, inquires other group wireless devices as connected in the connection group to acquire the connection parameters supported by said other group wireless devices, and adds the connection parameters of other group wireless devices applied in the connection group to the connection group attribute parameters of the connection group as well.

Preferably, as for some group wireless devices produced by the same manufacturer (such as Multi-channel sound box) or some group wireless devices commonly used in cooperation (such as Bluetooth keyboard and Bluetooth mouse), the group type parameter and the connection parameters in the corresponding connection group can be marked clearly when the products leave the factory, that is, marking the wireless devices that can be used in cooperation to form a connection group as the same group type, then the group first wireless device can select, through inquiring the group type of the peripheral wireless devices as looked up, other wireless devices belonging to the same group type as itself to form a certain connection group; the group first wireless device inquires said other group wireless devices about the connection parameters to be applied in the connection group, and automatically adds the connection parameters to the connection group attribute parameters of the connection group, thereby the group first wireless device can automatically form a connection group with other group wireless devices and configure a connection table.

In addition, considering different group connection combinations in specific application scenes, if the application connection types and roles of the wireless devices in the connection group are a little bit more and complex, the connection table can be configured manually and liberally by the users in the group first wireless device as well. The group first wireless device displays the peripheral wireless devices as looked up and the supported connection parameters to the users, then the users manually select a certain one or several other wireless devices therefrom to form a connection group in combination with the group first wireless device according to the specific application scene, and select the connection parameters of the respective group wireless devices in the connection group, such that the group first wireless device configures a connection table according to the users' operation.

Preferably, after configuring a connection table, the group first wireless device transmits the connection group attribute parameters in the configured connection table to other group wireless devices in the corresponding connection group, such that other group wireless devices store the connection group attribute parameters in their connection tables as well.

Preferably, if the third party wirelesses device has the connection group managing function, then the group first wireless device may transmit the connection group attribute parameters in the configured connection table to the third party wireless device.

In another preferable embodiment of the invention, since the wireless devices in the connection group support different wireless connection types, it is impossible to configure a connection table by the group first wireless device establishing connections with other group wireless devices one by one, preferably, said connection table is configured by the third party wireless device outside the connection group. The third party wireless device inquires the peripheral wireless devices as looked up to acquire their supported connection parameters and displays the connection parameters to the users, then the users manually select a certain one or several wireless devices among them and their connection parameters in the connection group; the third party wireless device configures a connection table and adds the connection parameters of respective group wireless devices to the connection group attribute parameters of the corresponding connection group.

The steps of establishing a corresponding wireless connection between the third party wireless device and the corresponding group wireless device in said connection group comprises: determining whether the third party wireless device has the connection group managing function; if so, the third party wireless device stores the connection table and realizes said automatic establishment according to the connection group attribute parameters in the connection table; if not, the group wireless device that establishes a connection requests for realizing said automatic establishment according to the connection group attribute parameters in the connection table.

A further aspect of the invention sets forth a group first wireless device for supporting automatically establishing and disconnecting several wireless connections with the third party wireless device, comprising:
a wireless module for making a wireless connection with other wireless devices;
a connection managing module for communicating with other wireless devices via the wireless module so as to manage several connections between the group wireless device and the third party wireless device, the connection managing module comprising:
a group wireless device selecting part for looking up the peripheral wireless devices and selecting one or more wireless devices therefrom as other group wireless devices to form a certain connection group together with said group first wireless device;
a connection parameters acquiring part for inquiring the selected other group wireless devices to acquire their supported connection parameters;
a connection table configuring part for storing a connection table to record connection group attribute parameters for the connection group formed by said group first wireless device and arranged for adding self-supported connection parameters that are going to be applied in the connection group to the connection group attribute parameters of the connection group, and adding the connection parameters to be applied in the connection group among the acquired connection parameters of other group wireless devices to the connection group attribute parameters of the connection group to configure the connection table.

According to a preferable embodiment of the invention, a group type attribute is set in a wireless device that can be used in cooperation to form a connection group, said wireless device selecting module automatically performs selection of a wireless device according to the group type criteria, said connection table configuring module acquires the connection parameters supported by other group wireless devices in the corresponding connection group as the added connection parameters according to the group type criteria.

According to another preferable embodiment of the invention, said wireless device selecting module selects other group wireless devices through interacting with users, said connection table configuring module selects the connection parameters of respective group wireless devices in the corresponding connection groups to be added through interacting with users.

Preferably, the connection managing module transmits the connection group attribute parameters in the configured connection table to other group wireless devices in the corresponding connection group via a wireless module so as to store the connection group attribute parameters in their connection tables.

When the group first wireless device establishes/disconnects a connection with the third party wireless device, the connection managing module determines whether the third party wireless device has the connection group managing function; if the result of the determining step is "Yes", the connection managing module transmits the stored connection table to the third party wireless device, moreover, the third party wireless device realizes said automatic establishing/disconnecting according to the connection group attribute parameters in the connection table; otherwise, the group first wireless device requests for realizing said automatic establishing/disconnecting according to the connection group attribute parameters in its connection table.

According to another aspect of the invention, a system that comprises the third party wireless device and several group wireless devices and supports automatically establishing and disconnecting several wireless connections is set forth. A connection table is configured by the group wireless device or the third party wireless device so as to combine said several group wireless devices into a connection group. The connection table records connection group attribute parameters for the connection group. The connection group attribute parameters include the connection parameters of respective group wireless devices in the connection group; when a certain group wireless device in the connection group establishes/disconnects a connection with the third party wireless device, whereas the connection parameters of said connection is present in the connection group attribute parameters of a certain connection group to which said group wireless device belongs, a corresponding wireless connection is automatically established/disconnected between the third party wireless device and other group wireless devices in said connection group according to other connection parameters included in the connection group attribute parameters.

Through the above manners, certain specific services provided by several wireless devices that are commonly used in cooperation or multi-function wireless products and wireless combination products (such as wireless multi-channel sound box, remote control function and wireless headset of Bluetooth smart phone, Bluetooth keyboard and Bluetooth mouse, etc.) can perform bundling of establishing and disconnecting connections and form a connection group, such that the users only need to operate a certain wireless device to establish or disconnect a connection with a wireless device in the connection group, then other wireless devices in the connection group can automatically establish or disconnect connections with this wireless device, which greatly facilitates the users' employment.

DESCRIPTION OF FIGURES

It will be helpful to understand the purpose and advantages of the present invention that the procedure of the invention is explained in detail with the aid of the drawings of preferable embodiments, wherein.

DETAILED DESCRIPTION OF THE EMBODIMENTS

Figure 1:
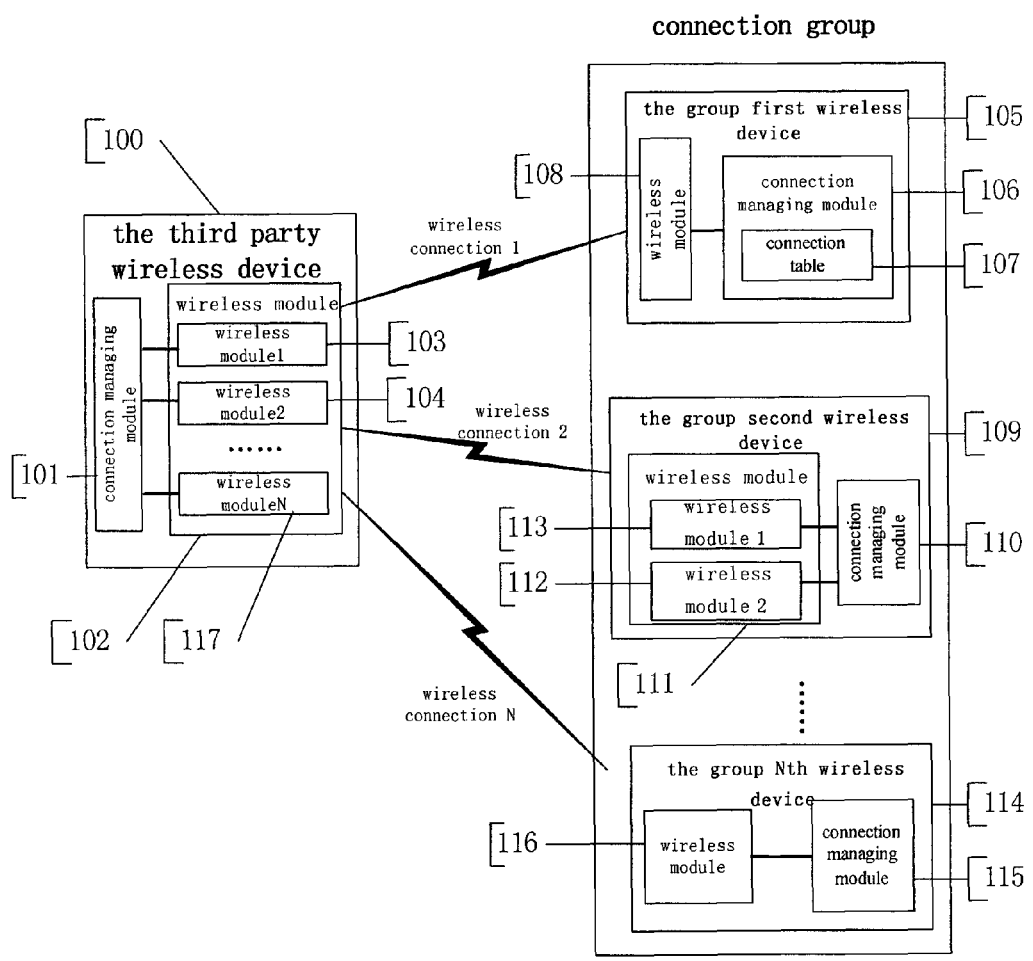
FIG. 1 is a structural diagram of a system for supporting automatically establishing and disconnecting several wireless connections.

FIG. 1 is a structural diagram of a system for supporting automatically establishing and disconnecting several wireless connections.

As shown in FIG. 1, two wireless devices, the group first wireless device 105 and group second wireless device 109, or N wireless devices (N is more than two), the group first wireless device 105 to the group Nth wireless device 114, form a connection group. The group first wireless device 105, the group second wireless device 109 to the group Nth wireless device in the connection group are provided with wireless modules 108, 111 and 116 respectively to make wireless communication with the third party wireless device 100, and also provided with connection managing modules 106, 110 and 115 for configuring a connection table 107 (shown in FIG. 2) to form a connection group and manage establishing and disconnecting a connection between the connection group and the third party wireless device 100. The wireless device in the connection group may be combined wireless product as well, here the group second wireless device 109 is given as an example, it supports various wireless technology, the wireless module 111 further includes, for example, a Bluetooth wireless module 112 and WiFi wireless module 113. In a certain connection group, it is allowable to select and employ the Bluetooth wireless module 112 or WiFi wireless module 113. In this example, the connection table 107 is stored in the connection managing module 106 of the group first wireless device 105. People skilled in the art will understand that the group second wireless device 109 to the group Nth wireless device 114 may also acquire the connection table 107 of the group first wireless device 105 and store it in their respective connection managing modules 110 and 115.

The third party wireless device 100 that makes wireless communication with the connection group is provided with a wireless module 102 for making wireless communication with several wireless devices in the connection group, i.e. the group first wireless device 105 to the group Nth wireless device 114. In the third party wireless device 100, it is also allowable to set a connection managing module 101 for configuring and storing the connection table 107 in the connection group, and while managing automatically establishing and disconnecting a wireless connection with the group first wireless device 105 to the group Nth wireless device 114 in the connection group. If, for example, the wireless connection types of the group first wireless device 105 to the group Nth wireless device in the connection group are different, then the wireless module 102 of the third party wireless device 100 may possibly contain several wireless modules 103, 104 and 117 for supporting wireless connection types of the group first wireless device 105 to the group Nth wireless device 114 simultaneously. Certainly, if the wireless connection types supported by the wireless devices in the connection group are same, the third party wireless device 100 only needs to have a wireless module supporting this wireless connection type.

If the third party wireless device 100 establishes a connection with the group first wireless device 105, and said connection is the one of the application connection type and role of the group first wireless device 105 as specified by the connection table 107 in the connection group, then the third party wireless device establishes connections automatically and sequentially with all other wireless devices, the group second wireless device 109 to the group Nth wireless device 114, in the connection group, and said connections are the ones of the application connection types and roles of the group second wireless device 109 to the group Nth wireless device 114 as specified by the connection table.

If the third party wireless device 100 disconnects a connection with the group first wireless device 105, said connection being the one of the application connection type and role of the group first wireless device 105 as specified by the connection table 107 in the connection group, then the third party wireless device disconnects with all other wireless devices in the connection group, i.e. the group second wireless device 109 to the group Nth wireless device 114, a connection of the application connection types and roles of the group second wireless device 109 to the group Nth wireless device 114 as specified by the connection table 107 in the connection group automatically and sequentially. Likewise, if the third party wireless device 100 disconnects with one of the group second wireless device 109 to the group Nth wireless device 114 a connection of the application connection types and roles as specified by the connection table 107 in the connection group, then the third party wireless device 100 will also disconnect automatically and sequentially with all other wireless devices in the connection group a connection of the application connection type and role of said other wireless devices as specified by the connection table 107 in the connection group according to the connection table 107.

It is noteworthy that the group first wireless device 105 to the group Nth wireless device 114 in the connection group and the third party wireless device 100 are possibly provided with various peripheral devices such as internal storage device, external storage device and wired communication device and various interfaces such as display interface and input interface, however, the relevant diagrams and explanation are omitted in order not to shield the gist of the invention.

Figure 2:
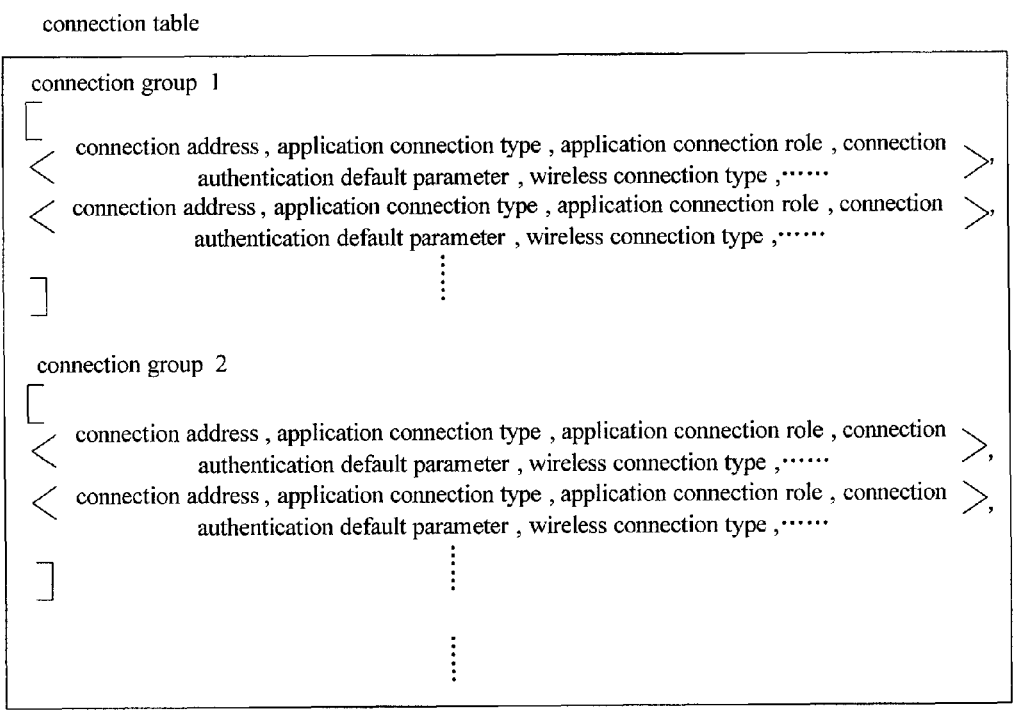
FIG. 2 is a structural diagram of a connection table.

FIG. 2 is a structural diagram of a connection table.

As shown in FIG. 2, the connection table includes connection group attribute parameters of at least one connection group, said connection group attribute parameters comprise the connection parameters of respective group wireless devices, such as a connection address, application connection type and application connection role. The users may add other attribute parameters according to needs, such as a connection authentication default parameter and a wireless connection type, and etc.

In this example, the connection table uses the contents in angular brackets "< >" to represent the connection parameters of a group wireless device in the connection group, and uses the contents in square brackets "[ ]" to represent the connection group attribute parameters of a connection group in the connection table. Apparently, one connection table may possibly comprise the connection group attribute parameters of several connection groups, whereas one connection group attribute parameter may comprise several connection parameters.

In the interests of conciseness, the following statements are based on the situation that both the group first wireless device and the group second wireless device form a connection group. Certainly, it will be understood that the number of the group wireless devices in the connection group can be more than two.

Figure 3:
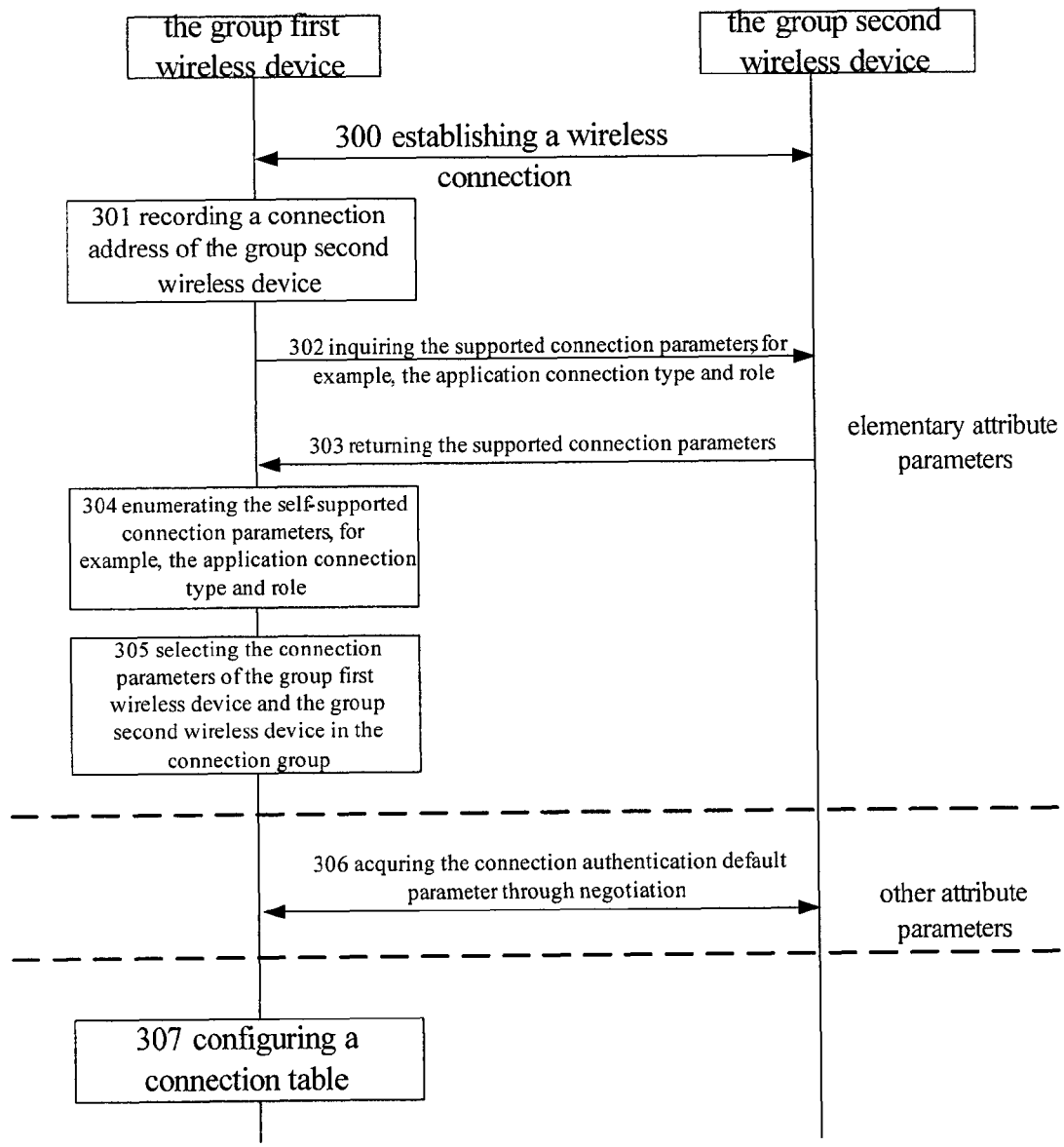
FIG. 3 is a message flow chart of a method for configuring a connection table via the group first wireless device.

FIG. 3 is a message flow chart of a method for configuring a connection table via the group first wireless device.

The group first wireless device that is intended to form a connection group establishes a connection with the group second wireless device as looked up, and records a connection address of the group second wireless device 300; the group first wireless device inquires a connection parameters (such as the application connection type and role) supported by the group second wireless device 301, the group second wireless device returns the supported connection parameters to the group first wireless device 302; the group first wireless device enumerates a self-supported connection parameter 303; the users select, in the group first wireless device, the connection parameters to be used in said connection group by the group first wireless device and a corresponding connection parameters to be used in said connection group by the group second wireless device 304. Therefore, the group first wireless device determines the connection group attribute parameters required by the connection table, such as the connection addresses, the application connection type and role of the group first wireless device and the group second wireless device 305.

According to the users' needs, the steps of configuring a connection table may further comprise: if the group first wireless device and the group second wireless device support the same type of wireless connection, then the group first wireless device negotiates with the group second wireless device to acquire the connection authentication default parameter of the group first wireless device connecting with the third party wireless device and the connection authentication default parameter of the group second wireless device connecting with the third party wireless device, and make said connection authentication default parameters serve as one attribute parameter 306 of said connection table in the connection group.

The group first wireless device configures a connection table stored in itself according to connection group attribute parameters such as the above selected connection addresses, the application connection types and roles, and the connection authentication default parameters of the group first wireless device and the group second wireless device 307.

Figure 4:
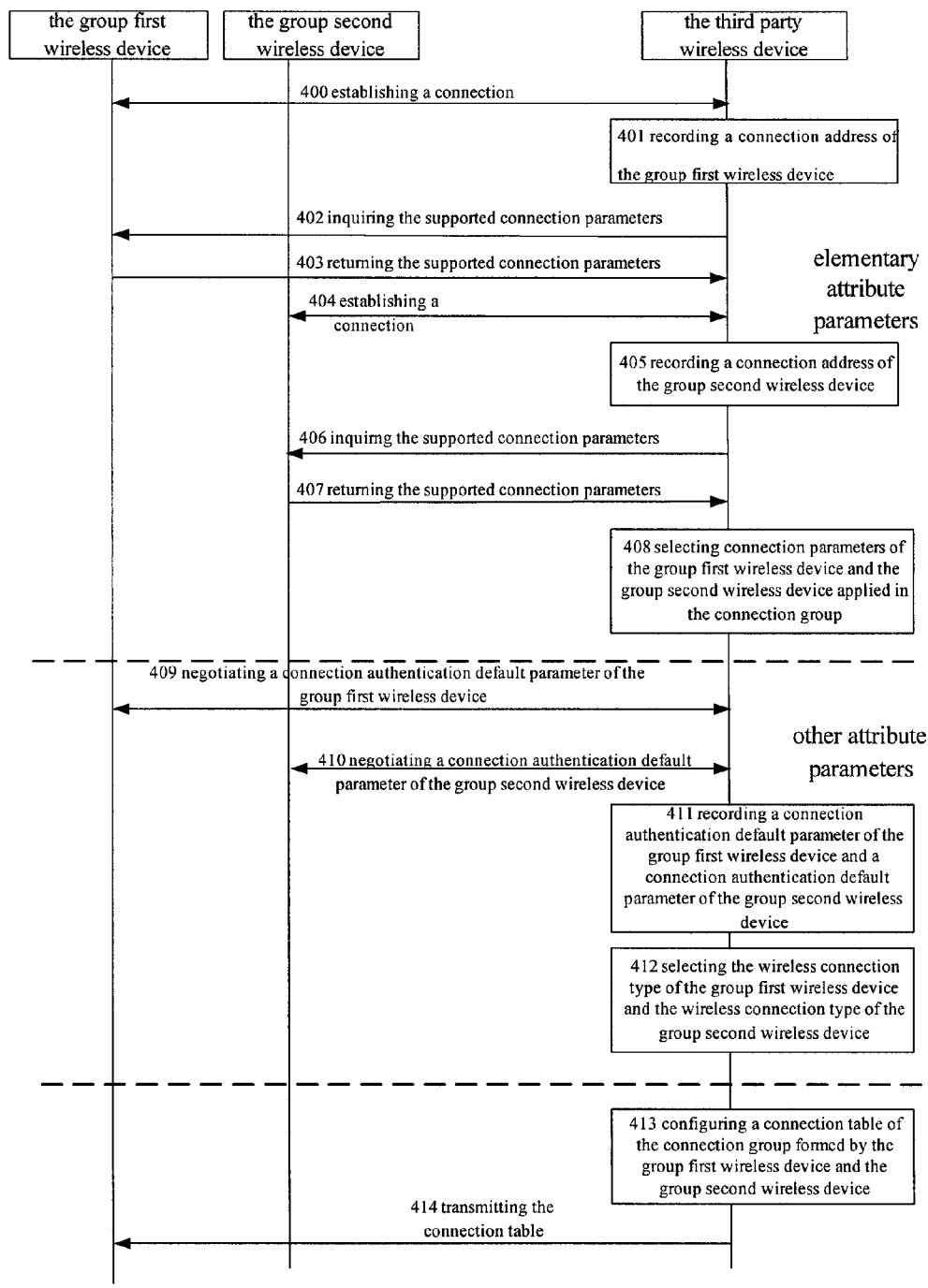
FIG. 4 is a message flow chart of a method for configuring a connection table via the third party wireless device.

FIG. 4 is a message flow chart of a method for configuring a connection table via the third party wireless device.

It is also allowable that the third party wireless device is provided with a connection group managing function/module, and the third party wireless device configures the connection table. Hereinafter, the message procedure is explained still taking the example that the group first wireless device and the group second wireless device form a connection group.

The third party wireless device establishes a connection with the group first wireless device 400, and records an address of the group first wireless device 401; the third party wireless device inquires which connection parameters are supported by the group first wireless device 402, for example, the application connection type and role, the group first wireless device returns the supported connection parameters to the third party wireless device 403; in the meanwhile, the third party wireless device establishes a connection with the group second wireless device 404, and records an address of the group second wireless device 405, the third party wireless device inquires what connection parameters are supported by the second group wireless device 406, the group second wireless device returns the supported connection parameters to the third party wireless device 407; at the side of the third party wireless device, the users select, according to the connection parameters returned by the group first wireless device and the group second wireless device, the connection parameters of the first group wireless device to be applied in this connection group, and a corresponding connection parameters of the group second wireless device 408.

According to the users' needs, the steps of configuring a connection table may further comprise: the third party wireless device negotiates with the group first wireless device to acquire a connection authentication default parameter of the group first wireless device connecting with the third party wireless device 409, in the meanwhile, the third party wireless device negotiates with the group second wireless device to acquire a connection authentication default parameter of the group second wireless device connecting with the third party wireless device 410. The third party wireless device records the connection authentication default parameters of the group first wireless device and the group second wireless device, and takes said connection authentication default parameters as an attribute parameter of said connection table in the connection group 411. In addition, if the wireless connection types selected by the group first wireless device and the group second wireless device in said connection group are different, or the group first wireless device or the group second wireless device is a wireless combination product, the users may select the wireless connection type of the group first wireless device and the wireless connection type of the group second wireless device on the third party wireless device as well, and take the selected wireless connection type as an attribute parameter 412 of said connection table in the connection group.

The third party wireless device configures a connection table according to connection group attribute parameters such as the connection parameters of the group first wireless device, for example, the connection address, the application connection type and role in said connection group, the connection authentication default parameter and the wireless connection type, and the connection parameters of the group second wireless device 413. After finishing configuring said connection table, the third party wireless device transmits said connection table to the group first wireless device to store 414. Alternatively, the third party wireless device transmits said connection table to the group first wireless device and the group second wireless device in the connection group simultaneously, and store it in the group first wireless device and the group second wireless device simultaneously. Those skilled in the art will understand that in such scene, the third party wireless device actually has the function of the group (first) wireless device, furthermore, if the group first wireless device and the group second wireless device are common wireless devices without the connection managing function, the present invention can also be implemented.

Figure 5:
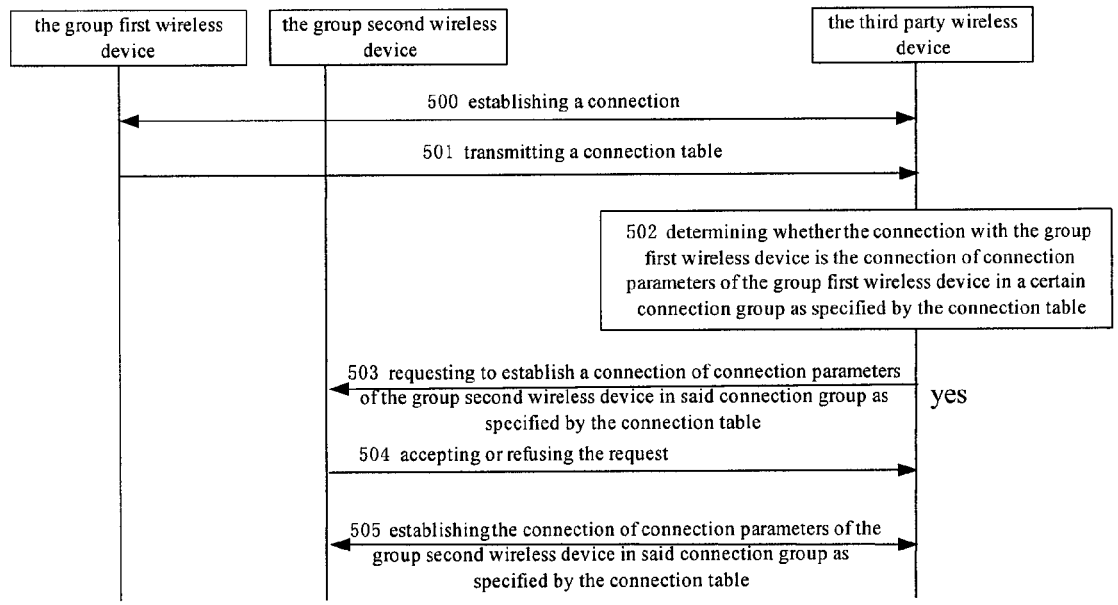
FIG. 5 is a message flow chart of a method by which the third party wireless device determines whether to establish or disconnect a connection with the group second wireless device in the connection group according to the connection table after the third party wireless device establishes or disconnects a connection with the group first wireless device, thus realizing automatically establishing several wireless connections.

FIG. 5 is a message flow chart of a method by which the third party wireless device determines whether to establish or disconnect a connection with the group second wireless device in the connection group according to the connection table after the third party wireless device establishes or disconnects a connection with the group first wireless device, thus realizing automatically establishing several wireless connections.

In this embodiment, the third party wireless device has a connection group managing function. The group first wireless device establishes a connection with the third party wireless device 500; if the third party wireless device does not store the connection table of this connection group in advance, the group first wireless device transmits the connection table to the third party wireless device as a data transmission command of the wireless connection 501, the third party wireless device receives the data containing said connection table, extracts said connection table and stores it in the connection managing module of the third party wireless device.

The third party wireless device enumerates the connection group attribute parameters recorded in said connection table, finds out all connection parameters relating to the group first wireless device in the connection table according to the connection address of the group first wireless device, and determines whether the connection between the third party wireless device and the group first wireless device is a connection of the connection parameters of the group first wireless device as specified by the connection table in a certain connection group 502; if so, the third party wireless device identifies the connection parameters of the group second wireless device in said connection group from the connection table, and automatically requests to establish with the group second wireless device a connection of the connection parameters of the group second wireless device as specified by said connection table in the connection group 503; the group second wireless device accepts or refuses said request 504, if the group second wireless device accepts the request, then the third party wireless device establishes with the group second wireless device the connection of the connection parameters of the group second wireless device as specified by said connection table in the connection group 505.

Figure 6:
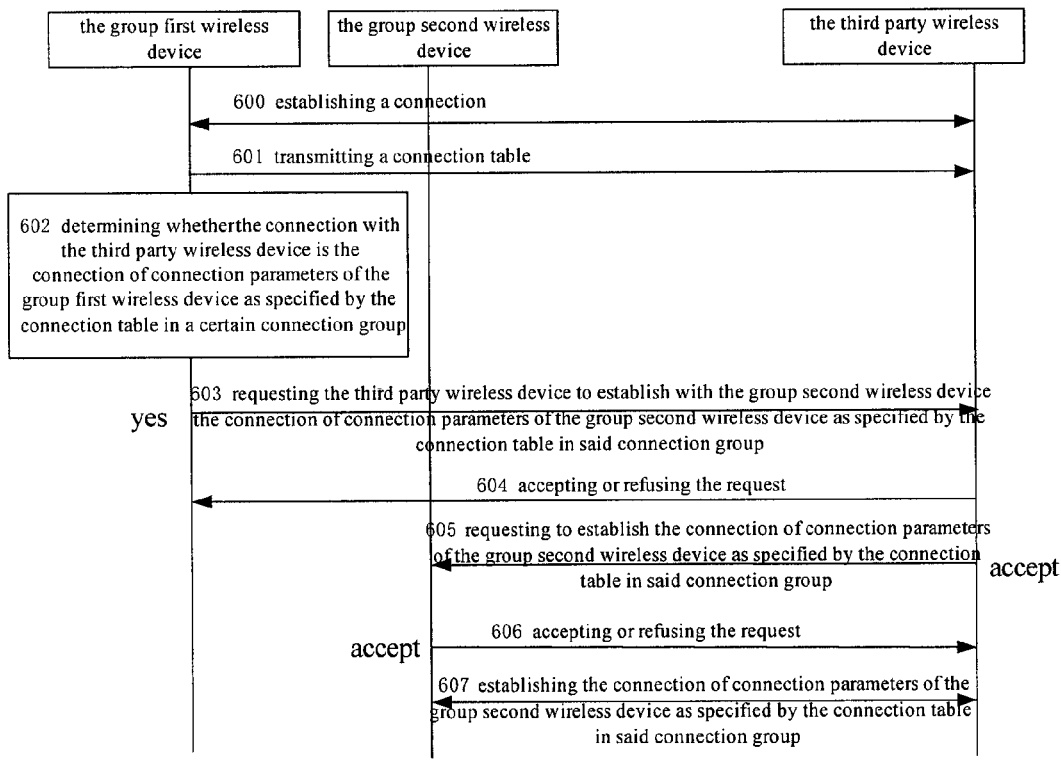
FIG. 6 is a message flow chart of a method by which the group first wireless device requests the third party wireless device to establish a connection with the group second wireless device after the third party wireless device establishes a connection with the group first wireless device, thus realizing automatically establishing several wireless connections.

FIG. 6 is a message flow chart of a method by which the group first wireless device requests the third party wireless device to establish a connection with the group second wireless device after the third party wireless device establishes a connection with the group first wireless device, thus realizing automatically establishing several wireless connections.

The third party wireless device establishes a connection with the group first wireless device 600; the group first wireless device determines whether the third party wireless device has a connection group managing function, if so, the group first wireless device transmits the connection table to the third party wireless device as a data transmission command of wireless connection 601, the third party wireless device identifies said connection table, extracts and stores it in the connection managing module thereof.

The group first wireless device enumerates the connection group attribute parameters recorded in the connection table, finds out all connection group attribute parameters relating to the group first wireless device in the connection table according to the connection address of the group first wireless device, and determines whether the connection between the third party wireless device and the group first wireless device is a connection of the connection parameters of the group first wireless device as specified by said connection table in a certain connection group 602; if so, the group first wireless device identifies the connection parameters of the group second wireless device in the connection group from said connection table, and requests the third party wireless device to establish with the group second wireless device a connection of connection parameters of the group second wireless device as specified by said connection table in the connection group 603, the third party wireless device selects to accept or refuse the request of the group first wireless device 604.

If the third party wireless device accepts the request of the group first wireless device, the third party wireless device automatically requests to establish with the group second wireless device a connection of connection parameters of the group second wireless device as specified by said connection table in the connection group according to the connection address of the group second wireless device 605; the group second wireless device selects to accept or refuse the request of the third party wireless device 606, if accepting the request, the third party wireless device establishes with the group second wireless device a connection of connection parameters of the group second wireless device as specified by said connection table in the connection group 607.

Figure 7:
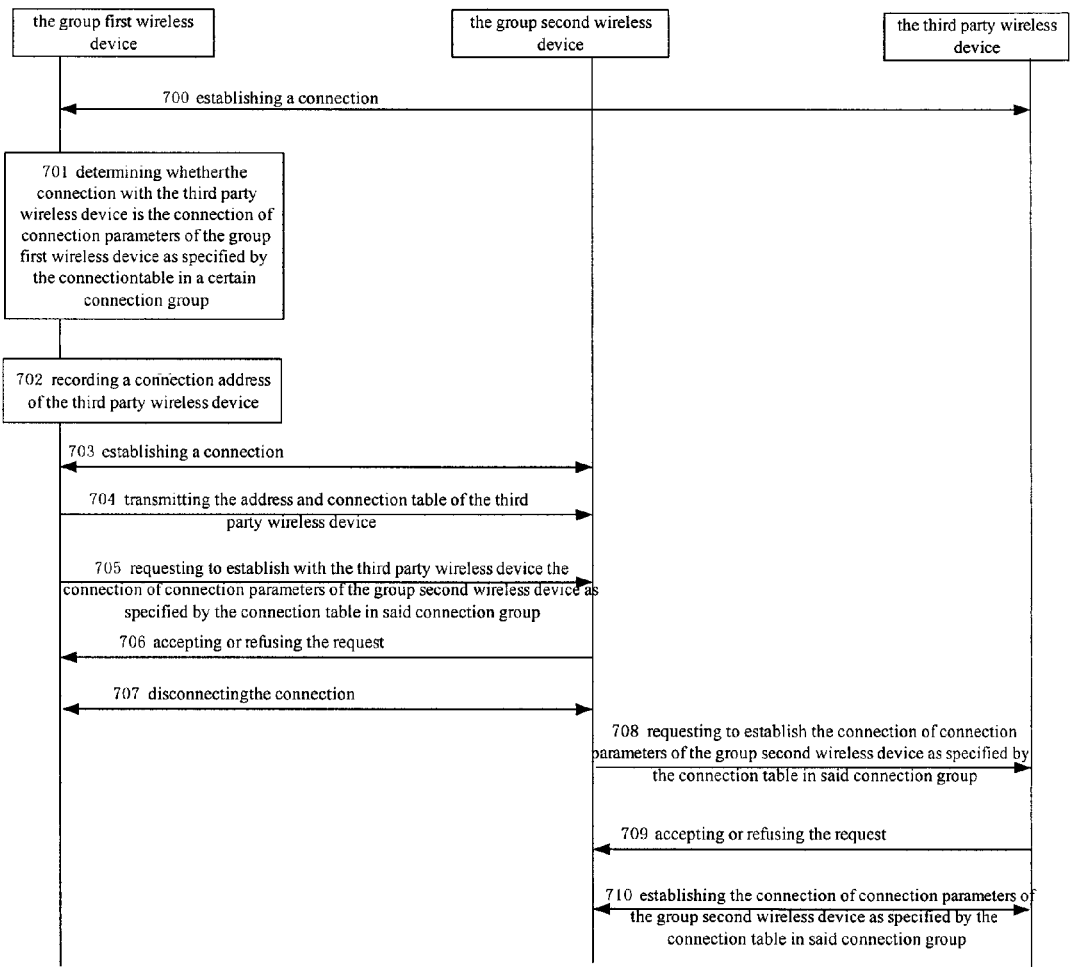
FIG. 7 is a message flow chart of a method by which the group first wireless device requests the group second wireless device to establish a connection with the third party wireless device after the third party wireless device establishes a connection with the group first wireless device, thus realizing automatically establishing several wireless connections.

FIG. 7 is a message flow chart of a method by which the group first wireless device requests the group second wireless device to establish a connection with the third party wireless device after the third party wireless device establishes a connection with the group first wireless device when the third party wireless device hasn't connection group managing function, thus realizing automatically establishing several wireless connections.

The third party wireless device establishes a connection with the group first wireless device 700; the group first wireless device enumerates attribute parameters recorded in the connection table, finds out all attribute parameters relating to the group first wireless device in the connection table according to the connection address of the group first wireless device, and determines whether the connection between the third party wireless device and the group first wireless device is a connection of connection parameters of the group first wireless device as specified by the connection table in a certain connection group 701; if so, the group first wireless device records a connection address of the third party wireless device 702, identifies attribute parameters of the group second wireless device in the connection group from the connection table, and establishes a connection with the group second wireless device according to the connection address of the group second wireless device 703; the group first wireless device transmits the connection address of the third party wireless device and the connection table to the group second wireless device as the data transmission command of the wireless connection 704, the group second wireless device identifies the data transmission command of the wireless connection and extracts said connection table and the connection address of the third party wireless device to store; the group first wireless device requests the group second wireless device to establish with the third party wireless device a connection of connection parameters of the group second wireless device as specified by said connection table in the connection group 705; the group second wireless device selects to accept or refuse the request of the group first wireless device 706, and disconnects the connection with the group first wireless device 707.

If the group second wireless device accepts the request of the group first wireless device, the group second wireless device automatically requests to establish with the third party wireless device a connection of connection parameters of the group second wireless device as specified by said connection table in the connection group 708; the third party wireless device accepts or refuses a request of the group second wireless device 709, if the third party wireless device accepts the request, then the group second wireless device automatically establishes with the third party wireless device a connection of connection parameters of the group second wireless device as specified by said connection table in the connection group 710.

Figure 8:
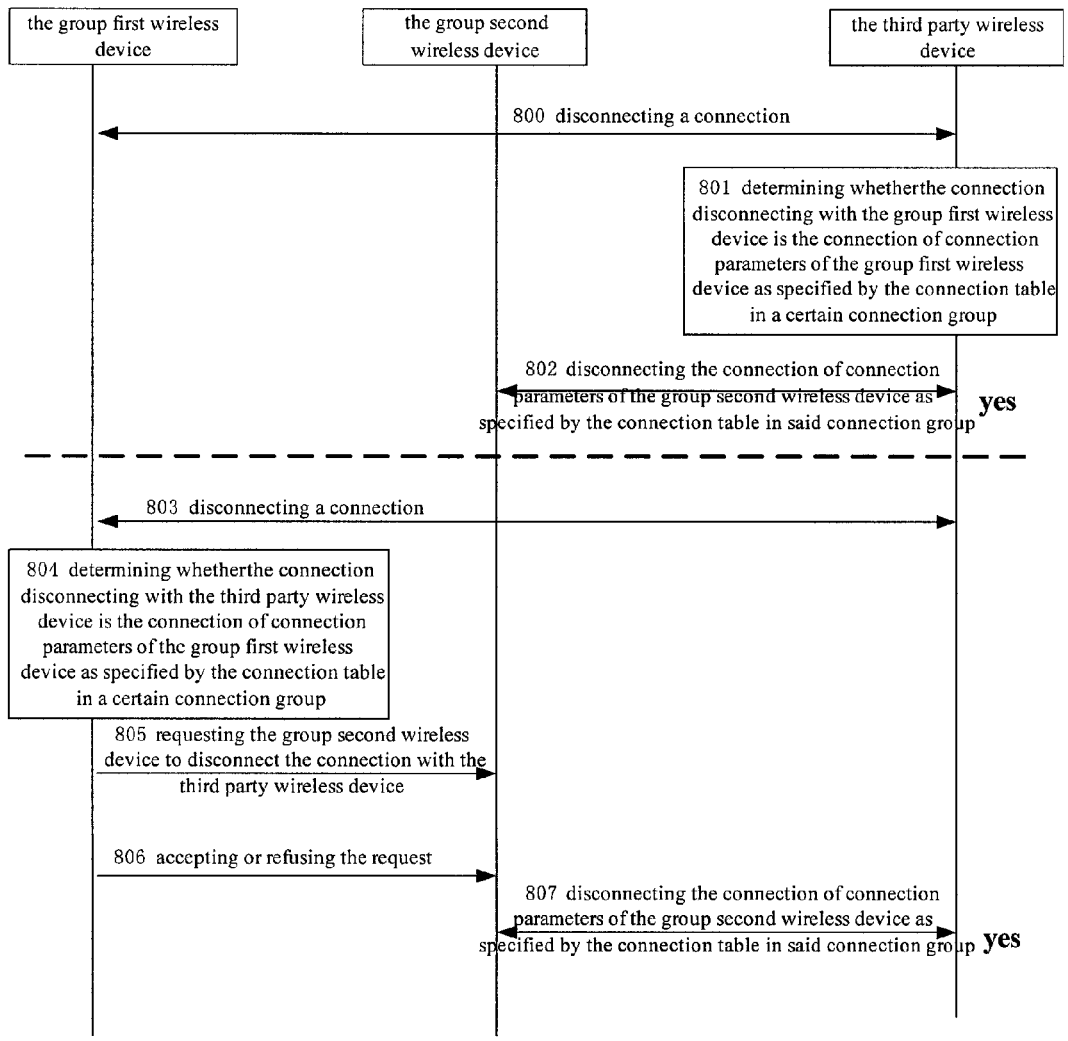
FIG. 8 is a message flow chart of automatically disconnecting several wireless connections.

FIG. 8 is a message flow chart of automatically disconnecting several wireless connections.

If the third party wireless device has a connection group managing function, during the procedure of establishing a connection, the group first wireless device has already transmitted said connection table to the third party wireless device. If the group first wireless device disconnects a connection with the third party wireless device 800, the third party wireless device enumerates attribute parameters recorded in the connection table, finds out all attribute parameters relating to the group first wireless device in the connection table according to the connection address of the group first wireless device, and determines whether the connection that the third party wireless device disconnects with the group first wireless device is a connection of connection parameters of the group first wireless device as specified by the connection table in a certain connection group 801, if so, the third party wireless device identifies from the connection table the attribute parameters of the group second wireless device in the connection group, and automatically disconnects with the group second wireless device a connection of connection parameters of the group second wireless device as specified by said connection table in the connection group 802.

If the third party wireless device does not have a connection group managing function, after the group first wireless device disconnects a connection with the third party wireless device 803, the group first wireless device determines whether the connection that the third party wireless device disconnects with the group first wireless device is a connection of connection parameters of the group first wireless device as specified by the connection table in a certain connection group 804; if so, the group first wireless device identifies from the connection table the attribute parameters of the group second wireless device in the connection group, requests the group second wireless device to disconnect with the third party wireless device a connection of connection parameters of the group second wireless device as specified by said connection table in the connection group 805, the group second wireless device accepts or refuses the requests 806. If the group second wireless device accepts the request, then the group second wireless device disconnects a corresponding connection with the third party wireless device 807.

Similarly, if the group second wireless device stores a connection table as well, when the third party wireless device first disconnects a connection with the group second wireless device, the third party wireless device automatically disconnects with the group first wireless device a corresponding connection in the corresponding connection group according to the aforesaid steps.

Below, further statement is made in combination with specific wireless technology.

Specific Embodiment 1 several wireless connections is automatically established and disconnected between a Bluetooth smart phone, Bluetooth headset and WiFi access point and a PC (as shown in FIGS. 9-14).

Figure 9:
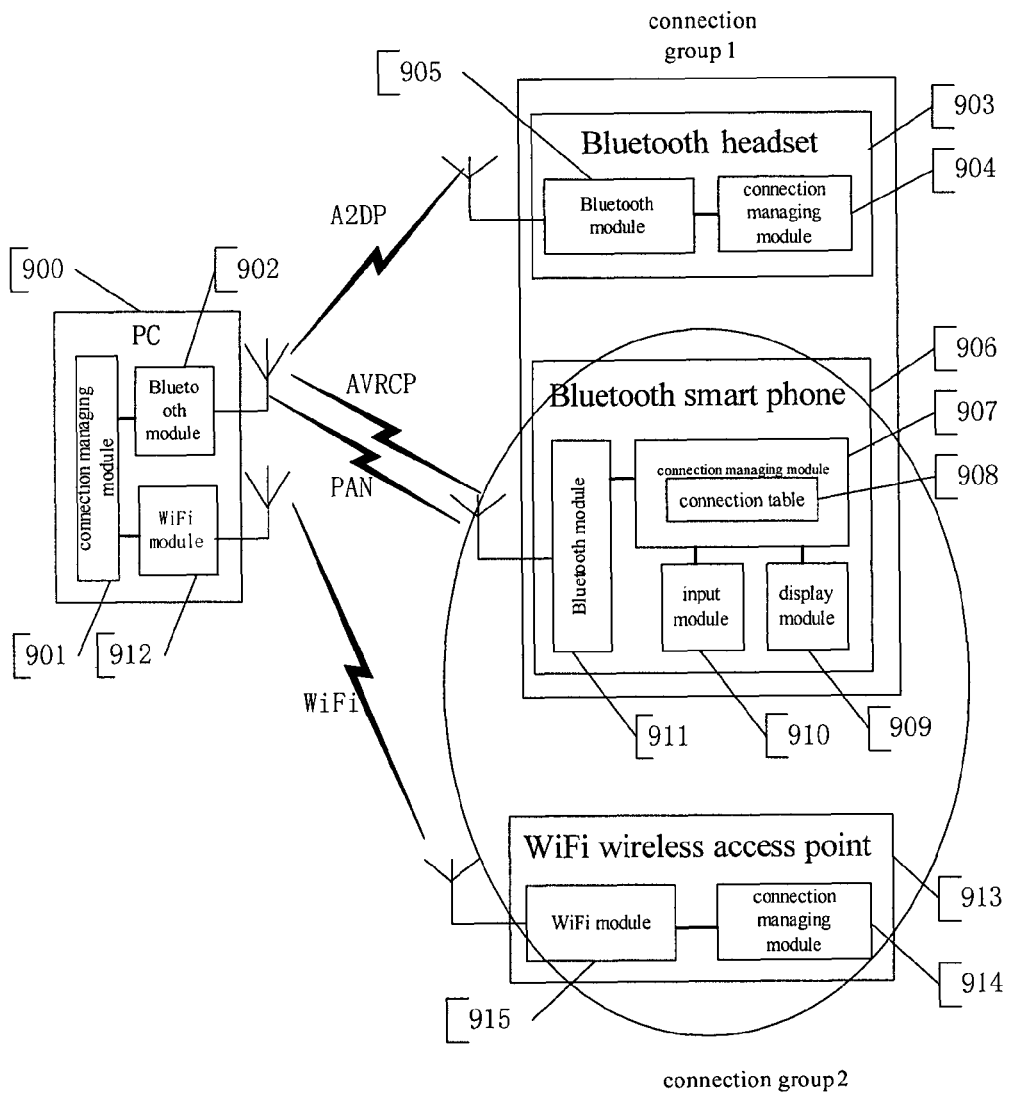
FIG. 9 is a structural diagram of a system of specific embodiment wherein connection group 1 formed by a Bluetooth smart phone and a Bluetooth headset and connection group 2 formed by a Bluetooth smart phone and a WiFi access point automatically establish and disconnect several wireless connections with PC.

FIG. 9 is a specific embodiment of the system according to the invention, the system comprising a connection group 1 formed by a Bluetooth smart phone and a Bluetooth headset and a connection group 2 formed by the Bluetooth smart phone and a WiFi access point, these two connection groups being intended to automatically establish and disconnect several wireless connections with a PC;

As shown in FIG. 9, a Bluetooth smart phone 906 includes a Bluetooth module 911 and connection managing module 907, and also has an input module 910 and display module 909, it is allowable to configure a connection group formed by the Bluetooth headset 903 and Bluetooth smart phone 906 in the connection table 908 via an interface of the Bluetooth smart phone 906. The connection table 908 is stored in the connection managing module 907 of the Bluetooth smart phone 906. The Bluetooth smart phone 906 and the Bluetooth headset 903 form a connection group. The Bluetooth headset 903 may synchronize a connection table 908 stored in the Bluetooth smart phone 906 and store it in a connection managing module 904.

The connection group formed by the Bluetooth smart phone 906 and Bluetooth headset 903 is in connection with the PC, wherein the Bluetooth smart phone 906 remotely controls an audio player on a PC 900 via Bluetooth AVRCP application connection, whereas the Bluetooth headset 903 can listen to an audio data stream played by the audio player on the PC 900 via Bluetooth A2DP application connection. Therefore, the connection group attribute parameters of the connection group formed by the Bluetooth smart phone 906 and Bluetooth headset 903 that are recorded in the connection table 908 (as shown in FIG. 10) are specifically as follows: the application connection type of the Bluetooth smart phone 906 in the connection group is AVRCP, the role is CT, whereas the application connection type of the Bluetooth headset 903 in the connection group is A2DP, the role is SNK.

In the meanwhile, the Bluetooth smart phone 906 and a WiFi access point 913 form another connection group. Since the Bluetooth smart phone 906 and WiFi access point 913 support different types of wireless connections, it is impossible to exchange information relating to connection parameters between them, therefore, a connection table needs to be configured at the PC 900 end provided with a connection group managing module, the PC 900 then transmits the connection table to the Bluetooth smart phone 906. A Bluetooth PAN application connection is established between the Bluetooth smart phone 906 and PC 900 to form a TCP/IP network, a WiFi connection is established between the PC 900 and WiFi access point 913, the PC 900 accesses to the fixed TCP/IP network via the WiFi access point 913, the PC 900 enables the Bluetooth smart phone 906 to access to the fixed TCP/IP network via the PC 900 and WiFi access point 913 as a TCP/IP network bridge. Therefore, the connection group attribute parameters of the connection group formed by the Bluetooth smart phone 906 and WiFi access point 913 as recorded in the connection table 908 (as shown in FIG. 10) are provided specifically as follows: the application connection type of the Bluetooth smart phone 906 in the connection group is "PAN", the role is "PANU", whereas the application connection type and role of WiFi are empty.

Figure 10:
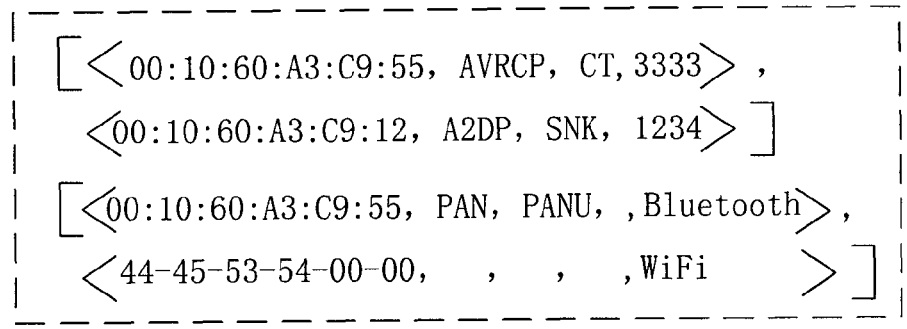
FIG. 10 is a connection table stored in the Bluetooth smart phone of FIG. 9.

FIG. 10 is a connection table stored in the Bluetooth smart phone of FIG. 9.

As stated above, the Bluetooth smart phone forms two connection groups together with the Bluetooth headset and the WiFi access point respectively, so the connection table thereof stores the connection group attribute parameters of these two connection groups. The connection group formed by the Bluetooth smart phone and Bluetooth headset records four connection parameters in the connection table, namely: connection address, application connection type, application connection role and connection authentication default parameter. For instance, in this connection group, the connection address of the Bluetooth smart phone is "00:10:60:A3:C9:55", the application connection type is "AVRCP", the application connection role is "CT", and the connection authentication default parameter is "3333"; while the connection address of the Bluetooth headset is "00:10:60:A3:C9:12", the application connection type is "A2DP", the application connection role is "SNK", and the connection authentication default parameter is "1234".

In the meanwhile, the connection group formed by the Bluetooth smart phone and WiFi access point records four connection parameters in the connection table, namely: connection address, application connection type, application connection role and wireless connection type. For instance, in this connection group, the connection address of Bluetooth smart phone is "00:10:60:A3:C9:55", the application connection type is "PAN", the application connection role is "PANU", and the wireless connection type is "Bluetooth"; while the connection address of WiFi access point is "44-45-53-54-00-00", the application connection type and role are empty, and the wireless connection type is "WiFi'. There is no connection authentication default parameter recorded in the connection group attribute parameters, therefore, the fourth connection parameter (i.e. the connection authentication default parameter) of these two devices is empty in the connection table.

Figure 11:
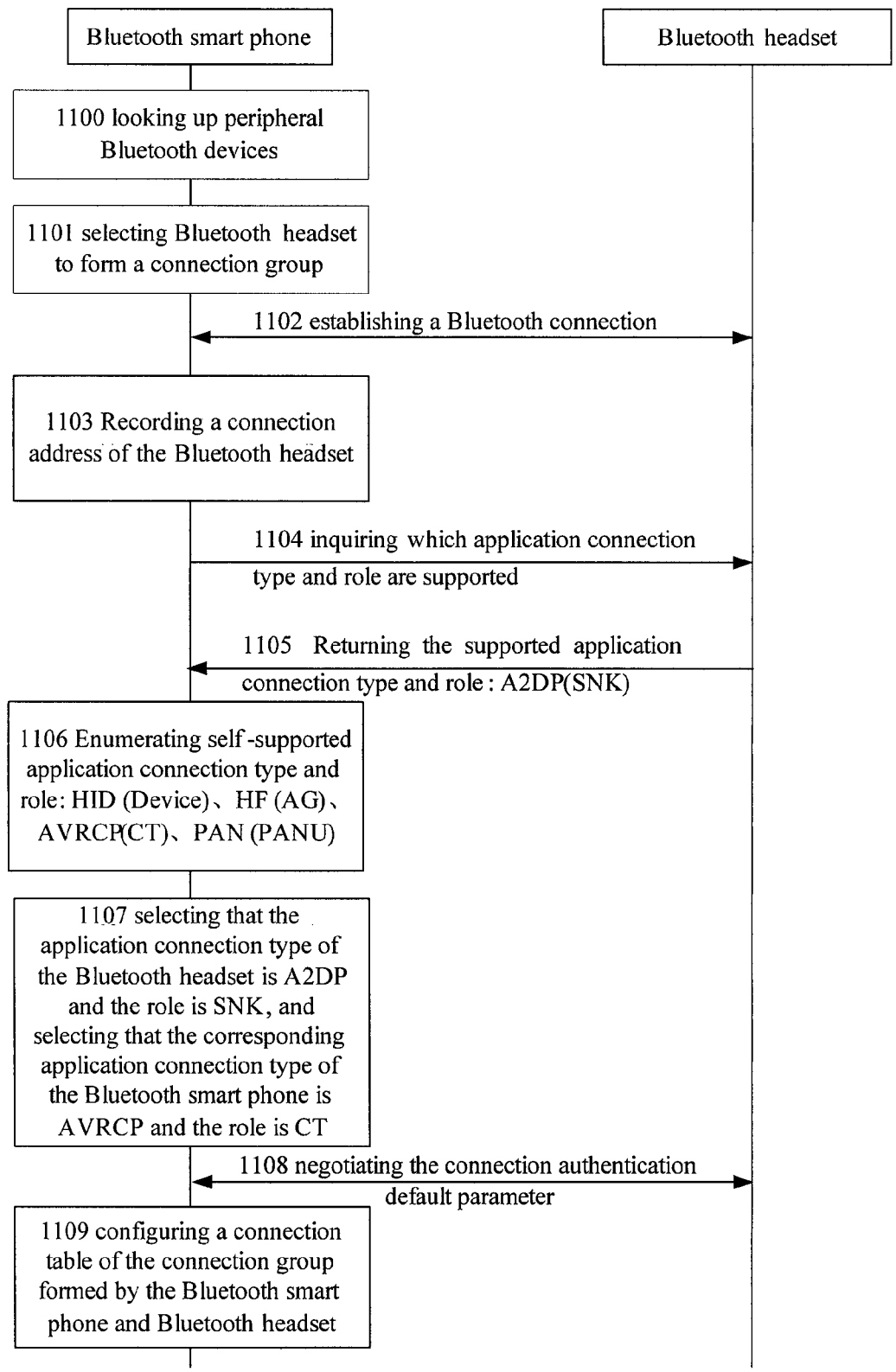
FIG. 11 is a message flow chart illustrating the connection group formed by the Bluetooth smart phone and the Bluetooth headset in FIG. 9 configures a connection table via the Bluetooth smart phone.

FIG. 11 is a message flow chart illustrating the connection group formed by the Bluetooth smart phone and Bluetooth headset in FIG. 9 configures a connection table via the Bluetooth smart phone.

The Bluetooth smart phone looks up peripheral Bluetooth devices through an "HCI_Inquiring" command of Bluetooth General Access Profile (GAP) 1100, the users select the Bluetooth headset as a group wireless device from the peripheral Bluetooth devices as looked up to form a connection group together with the Bluetooth smart phone 1101. The Bluetooth smart phone establishes a Bluetooth connection with the Bluetooth headset 1102, and records a connection address of the Bluetooth headset 1103; the Bluetooth smart phone inquires the service (i.e. the application connection type and role) provided by itself and the Bluetooth headset via a Bluetooth Service Discovery Protocol (SDP), the specific steps are: inquiring the Bluetooth headset via SDP which application connection type and service are supported by the Bluetooth headset 1104, the Bluetooth headset returns the supported application connection type "A2DP" and the corresponding role "SNK" to the Bluetooth smart phone 1105, the Bluetooth smart phone enumerates, via SDP, the self-supported HID application connection type and the corresponding role "Device", the HF application connection type and the corresponding role "AG", the AVRCP application connection type and the corresponding role "CT", and the PAN application connection type and the corresponding role "PANU" 1106; the aforesaid acquired connection parameters are displayed on a smart phone interface, the users select, according to the needs of the connection group, the application connection type of the Bluetooth headset as A2DP and the role as SNK, and corresponding to the application connection type A2DP of the Bluetooth headset, the users select, among the four application connection types supported by the Bluetooth smart phone, the application connection type of the Bluetooth smart phone in the connection group as AVRCP, and the role as CT 1107.

Alternatively, for the sake of safety of establishing a wireless connection, the Bluetooth smart phone negotiates with the Bluetooth headset to acquire the connection authentication default parameter of the Bluetooth smart phone connecting with the third party wireless device and a connection authentication default parameter of the Bluetooth headset connecting with the third party wireless device 1108.

The Bluetooth smart phone configures a connection group attribute parameters of the connection group formed by the Bluetooth smart phone and Bluetooth headset in the connection table 1109, according to the connection address, the application connection type and role, the connection authentication default parameter in the connection group of the Bluetooth smart phone aforesaid, and the connection address, the application connection type and role and the connection authentication default parameter in the connection group of the Bluetooth headset aforesaid.

Figure 12:
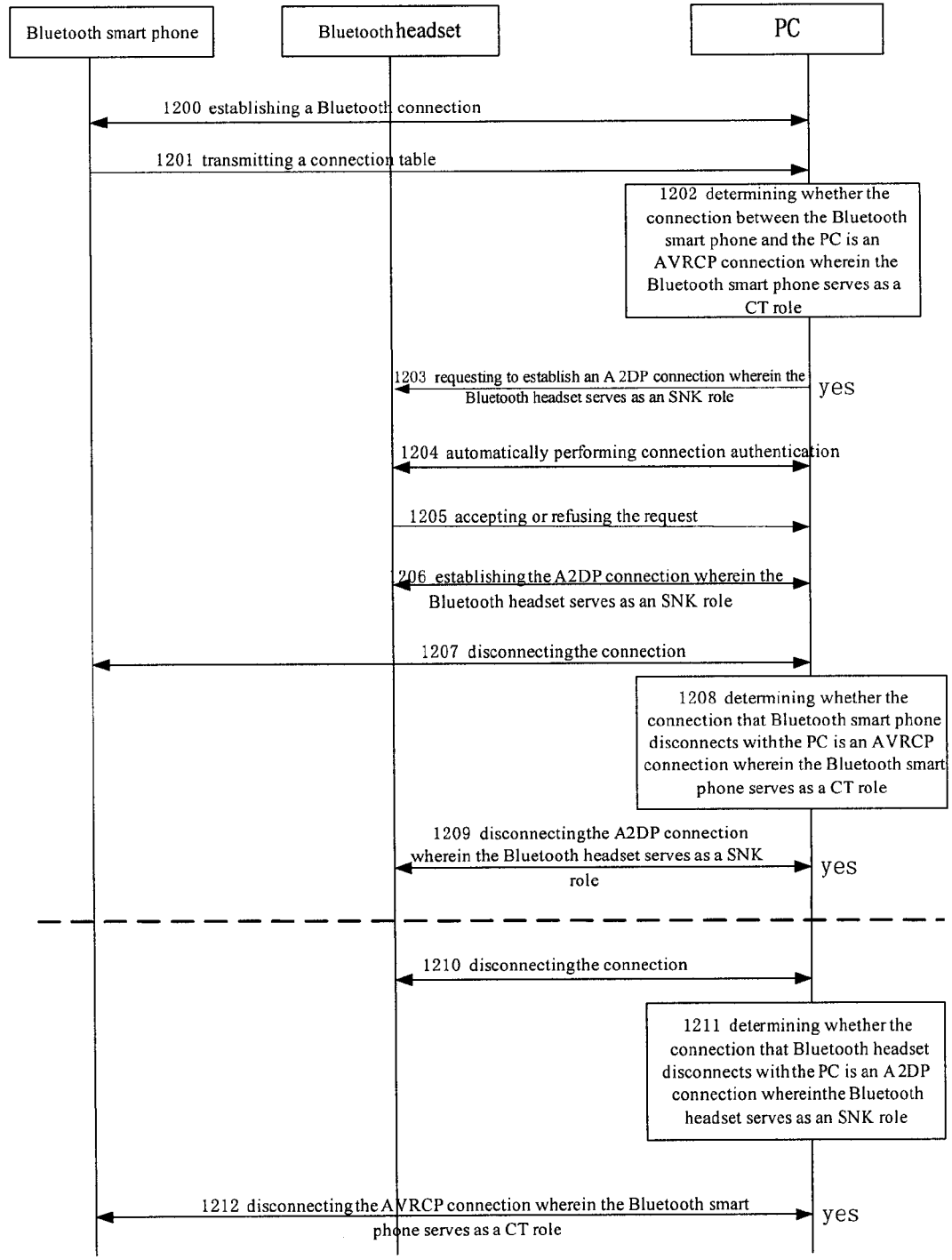
FIG. 12 is a message flow chart illustrating the connection group formed by the Bluetooth smart phone and the Bluetooth headset in FIG. 9 automatically establishes and disconnects several wireless connections with the PC.

FIG. 12 is a message flow chart illustrating the connection group formed by the Bluetooth smart phone and the Bluetooth headset in FIG. 9 automatically establishes and disconnects several wireless connections with the PC.

The Bluetooth smart phone establishes a Bluetooth connection with the PC 1200; if the PC has a connection group managing function, the Bluetooth smart phone will transmit the connection table stored by itself in the connection managing module to the PC as the data transmission command of wireless connection, the PC identifies and resumes said connection table via the connection managing module, and stores it in the connection managing module as well 1201.

The PC enumerates the connection group attribute parameters recorded in the connection table and finds out two attribute parameters relating to the Bluetooth smart phone according to the connection address of the Bluetooth smart phone, one is attribute parameters (an AVRCP connection wherein the Bluetooth smart phone serves as a CT role) of the Bluetooth smart phone in the connection group formed by the Bluetooth smart phone and the Bluetooth headset, the other is an attribute parameter (a PAN connection wherein the Bluetooth smart phone serves as a PANU role) of the Bluetooth smart phone in the connection group formed by the Bluetooth smart phone and the WiFi access point. The PC determines whether the connection with the Bluetooth smart phone is an attribute parameter of the Bluetooth smart phone in the connection group formed by the Bluetooth smart phone and the Bluetooth headset in the connection table, that is, an AVRCP connection wherein the Bluetooth smart phone serves as a CT role 1202.

If the PC determines that the application connection type of the Bluetooth smart phone is AVRCP and the role thereof is CT, then the PC identifies the Bluetooth headset according to the connection address "00:11:60:A3:C9:12" of the Bluetooth headset recorded in the connection group formed by the Bluetooth smart phone and the Bluetooth headset in the connection table, and automatically requests to establish with the Bluetooth headset an A2DP connection wherein the Bluetooth headset serves as an SNK role 1203; if the connection table contains connection authentication default parameters, the PC can automatically perform connection authentication on the Bluetooth headset according to the connection authentication default parameter "3333" of the Bluetooth headset in the connection table 1204, and accepts or refuses a request according to the result of authentication 1205. Once the connection authentication passed, the Bluetooth headset accepts the connection request, the PC and the Bluetooth headset establish the A2DP connection wherein the Bluetooth headset serves as an SNK role 1206.

When the Bluetooth smart phone disconnects the connection with the PC 1207, the PC enumerates the connection group attribute parameters recorded in the connection table, and finds out all attribute parameters of the Bluetooth smart phone involved in the connection table according to the connection address of the Bluetooth smart phone, determining whether the connection that the Bluetooth smart phone disconnects with the PC is an AVRCP connection wherein the Bluetooth smart phone serves as a CT role 1208, if so, the PC identifies attribute parameters of the Bluetooth headset in the connection group where an AVRCP connection in the connection table is present, said AVRCP connection having the Bluetooth smart phone served as a CT role, the PC automatically disconnects with the Bluetooth headset the A2DP connection wherein the Bluetooth headset serves as an SNK role 1209. Likewise, when the Bluetooth headset first disconnects the connection with the PC 1210, the PC determines whether the connection that the Bluetooth headset disconnects with the PC is an A2DP connection wherein the Bluetooth headset serves as an SNK role 1211, if so, the PC identifies attribute parameters of the Bluetooth smart phone in the connection group where the A2DP connection in the connection table is present, said A2DP connection having the Bluetooth headset served as an SNK role, and the PC automatically disconnects with the Bluetooth smart phone the AVRCP connection wherein the Bluetooth smart phone serves as a CT role 1212.

Figure 13:
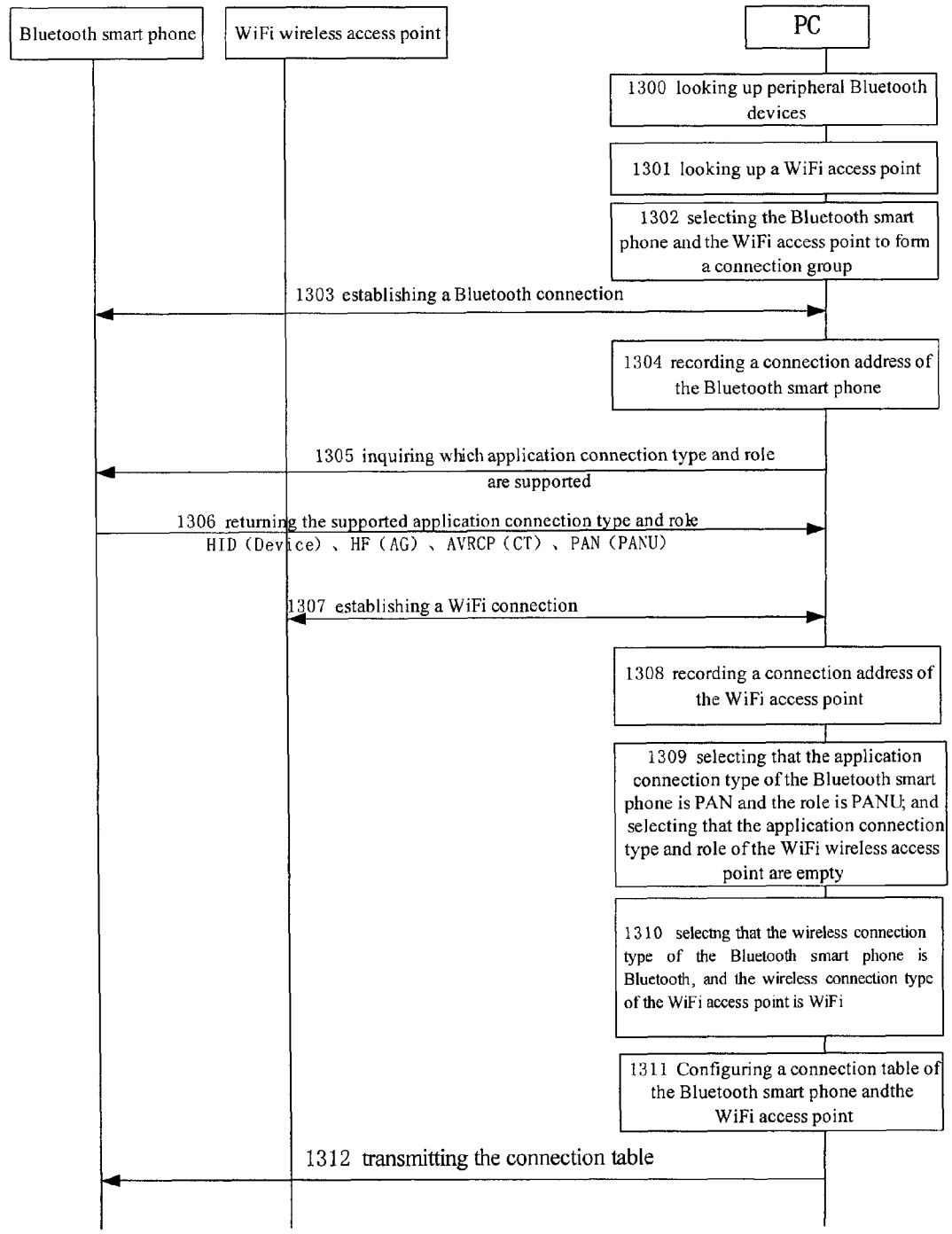
FIG. 13 is a message flow chart illustrating the connection group formed by the Bluetooth smart phone and the WiFi access point in FIG. 9 configures a connection table via PC.

FIG. 13 is a message flow chart illustrating the connection group formed by the Bluetooth smart phone and the WiFi access point in FIG. 9 configures a connection table via the PC.

The PC searches peripheral Bluetooth devices through an "HCI_Inquiring" command of the Bluetooth General Access Profile (GAP) 1300, and looks up the peripheral WiFi access point via the WiFi module 1301, the users select the Bluetooth smart phone and the WiFi access point as group wireless devices to form a connection group 1302.

The PC establishes a Bluetooth connection with the Bluetooth smart phone 1303 and records a connection address of the Bluetooth smart phone 1304; the PC inquires via SDP which application connection type and role are supported by the Bluetooth smart phone 1305, the Bluetooth smart phone returns to the PC the supported HID application connection type and the corresponding role "Device", the HF application connection type and corresponding role "AG", the AVRCP application connection type and corresponding role "CT", and the PAN application connection type and corresponding role "PANU" 1306.

The PC establishes a WiFi wireless connection with the WiFi access point 1307 and records a connection address of the WiFi access point 1308.

The users select on the PC that the application connection type of the Bluetooth smart phone in the connection group is PAN and the role is PANU, and that both the application connection type and the role of the WiFi access point in the connection group are empty 1309; in the meanwhile, since the Bluetooth smart phone and the WiFi access point support different wireless technology, the users select the wireless connection type of the Bluetooth smart phone as Bluetooth, and the wireless connection type of the WiFi access point as WiFi 1310.

The PC uses the aforesaid connection parameters such as the selected connection addresses of the Bluetooth smart phone and the WiFi access point, the application connection types and roles in the connection group and the wireless connection types to configure a connection table of the connection group formed by the Bluetooth smart phone and the WiFi access point 1311. The PC transmits the connection table to the Bluetooth smart phone via a data transmission command 1312, the connection managing module of the Bluetooth smart phone identifies the data transmission command and resumes the connection table, and adds it to the original connection table as connection group attribute parameters of the connection group.

Figure 14:
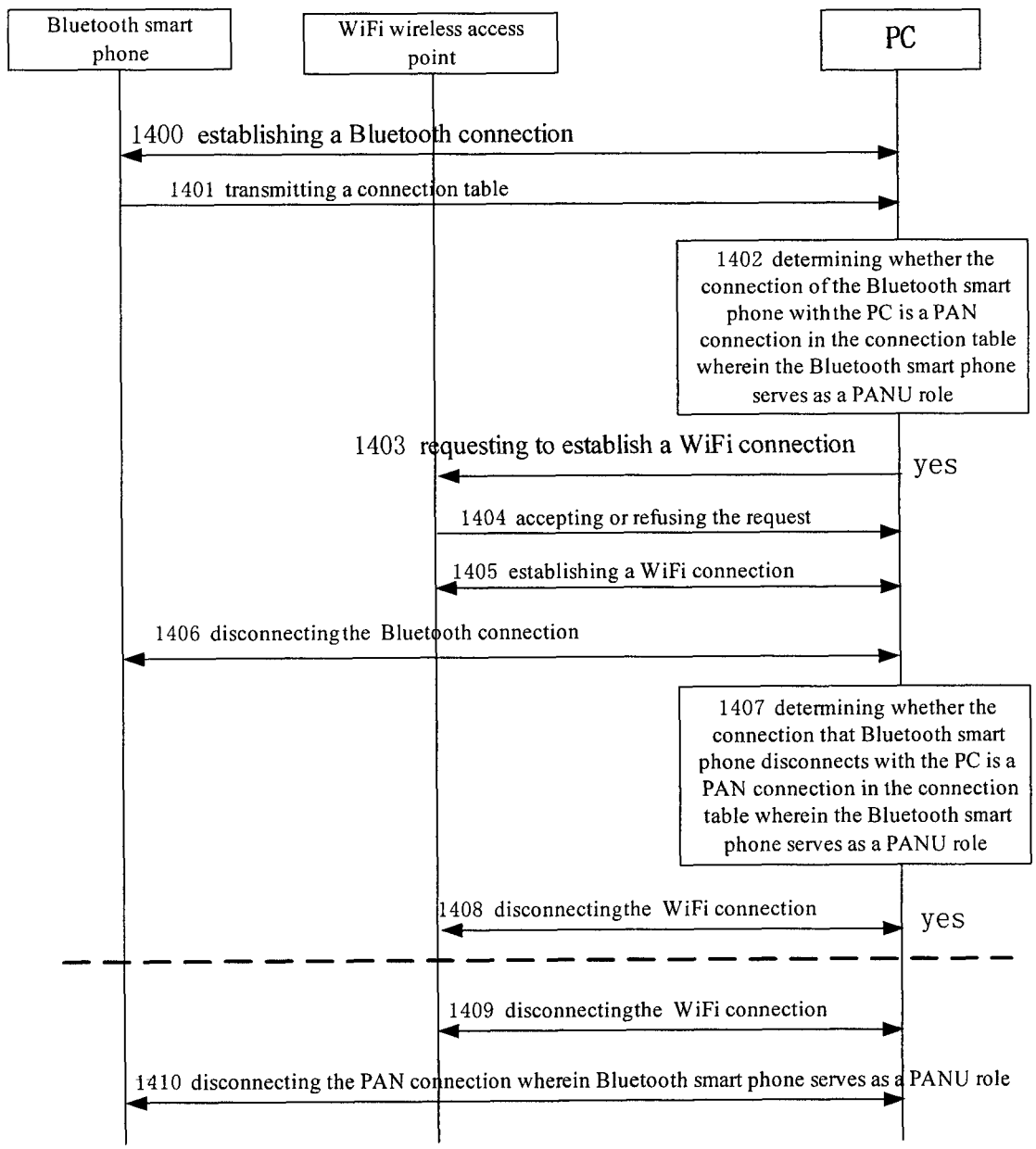
FIG. 14 is a message flow chart illustrating the connection group formed by the Bluetooth smart phone and the WiFi access point in FIG. 9 automatically establishes and disconnects several wireless connections with the PC.

FIG. 14 is a message flow chart illustrating the connection group formed by the Bluetooth smart phone and the WiFi access point in FIG. 9 automatically establishes and disconnects several wireless connections with the PC.

The Bluetooth smart phone establishes a Bluetooth connection with the PC 1400, if the PC has a connection group managing function, the Bluetooth smart phone then transmits the connection table stored in the connection managing module to the PC as the data transmission command of the wireless connection 1401, the PC identifies and resumes said connection table via the connection managing module and stores it in the connection managing module.

The PC enumerates connection group attribute parameters recorded in the connection table, and finds out two attribute parameters relating to the Bluetooth smart phone according to the connection address of the Bluetooth smart phone, one is an attribute parameter (an AVRCP connection wherein the Bluetooth smart phone serves as a CT role) of the Bluetooth smart phone in the connection group formed by the Bluetooth smart phone and Bluetooth headset, the other is an attribute parameter (a PAN connection wherein the Bluetooth smart phone serves as a PANU role) of the Bluetooth smart phone in the connection group formed by the Bluetooth smart phone and the WiFi access point. The PC determines, according to the connection with the Bluetooth smart phone, whether it is an attribute parameter of the Bluetooth smart phone in the connection group formed by the Bluetooth smart phone and the WiFi access point in the connection table, that is, a PAN connection wherein the Bluetooth smart phone serves as a PANU role 1402: if so, the PC identifies the WiFi access point according to the connection address "44-45-53-54-00-00" of the WiFi access point recorded in the connection group formed by the Bluetooth smart phone and the WiFi access point in the connection table, and automatically requests to establish a WiFi connection with the WiFi access point 1403; the WiFi access point accepts or refuses the request 1404, if the WiFi access point accepts the connection request, the PC then establishes the WiFi connection with the WiFi access point 1405.

When the Bluetooth smart phone disconnects the connection with the PC 1406, the PC enumerates the connection group attribute parameters recorded in the connection table, and determines whether the connection that the Bluetooth smart phone disconnects with the PC is a PAN connection wherein the Bluetooth smart phone serves as a PANU role 1407, if so, the PC identifies attribute parameters of the WiFi access point in the connection group where the PAN connection in the connection table is present, said PAN connection having the Bluetooth smart phone served as a PANU role, the PC automatically disconnects the WiFi connection with the WiFi access point 1408. Likewise, when the WiFi access point first disconnects the connection with the PC 1409, the PC enumerates the connection group attribute parameters recorded in the connection table, and finds out all attribute parameters of the WiFi access point in the connection table according to the connection address of the WiFi access point, that is, the attribute parameters of the WiFi access point in the connection group formed by the Bluetooth smart phone and the WiFi access point; the PC identifies attribute parameters of the Bluetooth smart phone in the connection group where the WiFi connection of the WiFi access point in the connection table is present, and automatically disconnects with the Bluetooth smart phone a PAN connection wherein the Bluetooth smart phone serves as a PANU role 1410.

Figure 15:
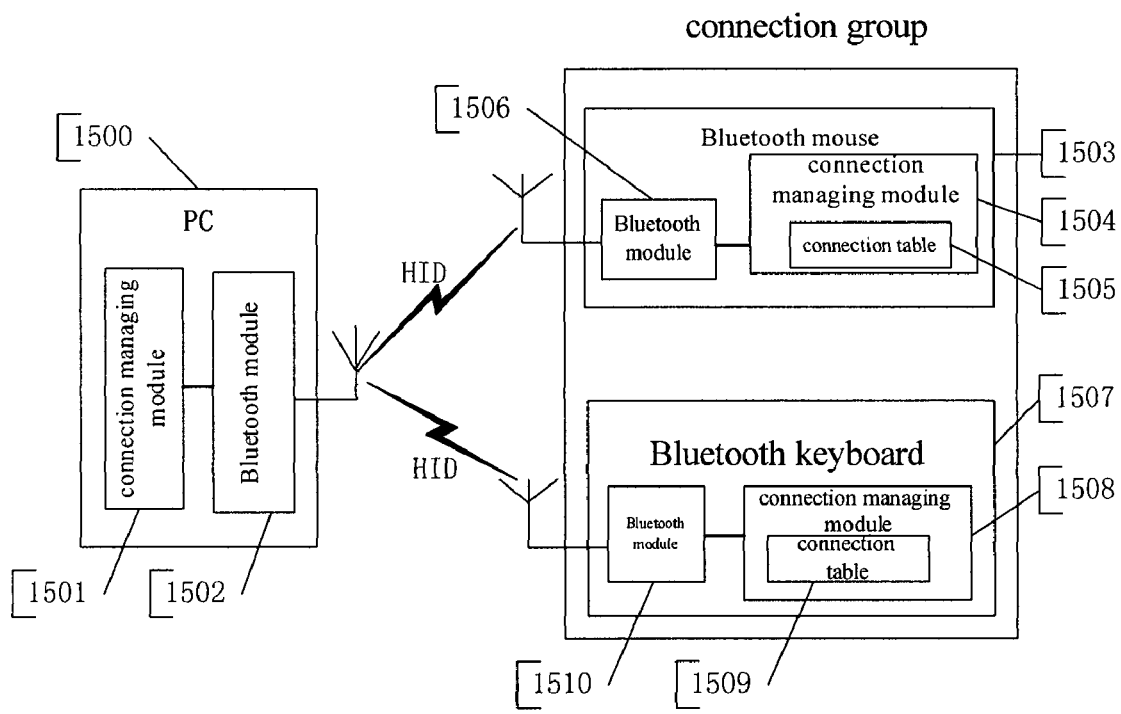
FIG. 15 is a structural diagram of a system of a specific embodiment wherein the connection group formed by a Bluetooth mouse and a Bluetooth keyboard automatically establishes and disconnects several wireless connections with PC.
Figure 16:
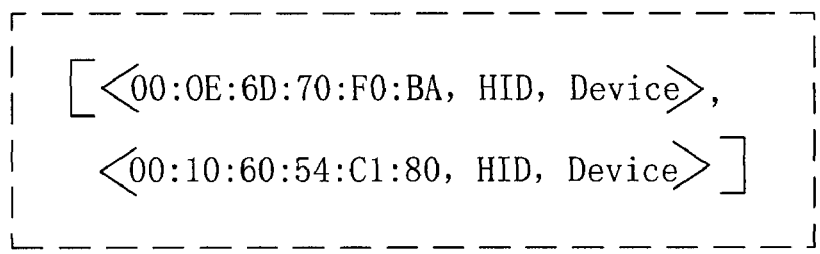
FIG. 16 is a connection table of the connection group formed by the Bluetooth mouse and the Bluetooth keyboard in FIG. 15.

Specific Embodiment II the connection group formed by the Bluetooth mouse and the Bluetooth keyboard automatically establishes and disconnects several wireless connections with the PC (see FIGS. 15-16).

FIG. 15 is a structural diagram of a system wherein the connection group formed by the Bluetooth mouse and the Bluetooth keyboard automatically establishes and disconnects several wireless connections with the PC.

A Bluetooth mouse 1503 and a Bluetooth keyboard 1507 are common devices that are frequently used by people in cooperation, and both support a Bluetooth HID connection. Therefore, using the Bluetooth mouse 1503 and the Bluetooth keyboard 1507 to form a connection group will bring a lot of convenience. Since the Bluetooth mouse 1503 and the Bluetooth keyboard 1507 only support Bluetooth HID application connection, it is easier to configure a connection table 1505 of the connection group formed by the Bluetooth mouse 1503 and the Bluetooth keyboard 1507, thus enabling the Bluetooth mouse 1503 and the Bluetooth keyboard 1507 to establish a connection and the Bluetooth mouse 1503 or the Bluetooth keyboard 1507 to automatically configure the connection table 1505. For example, the steps of the Bluetooth mouse 1503 automatically configuring the connection table 1505 of the connection group formed by the Bluetooth mouse 1503 and the Bluetooth keyboard 1507 comprise:

(a) the Bluetooth mouse 1503 establishing a connection with the Bluetooth keyboard 1507 and recording its own connection address and the connection address of the Bluetooth keyboard 1507;

(b) the Bluetooth mouse 1503 inquiring which application connection type and role are supported by the Bluetooth keyboard 1507, the Bluetooth keyboard 1507 returning the supported application connection type "HID" and the role "Device" to the Bluetooth mouse 1503;

(c) the Bluetooth mouse 1503 acquiring the application connection type "HID" and the role "Device" supported by itself through enumerating;

(d) the Bluetooth mouse 1503 forming the connection table 1505 of the connection group according to the connection address of the Bluetooth mouse 1503 and its application connection type and role in the connection group, and the connection address of the Bluetooth keyboard 1507 and its application connection type and role in the connection group, and storing said connection table in a connection manager 1504 of the Bluetooth mouse 1503.

The Bluetooth keyboard 1507 may as well synchronize the connection table 1505 in the Bluetooth mouse 1503, acquire a connection table 1509 and then store it in a connection managing module 1508. In this way, the Bluetooth mouse 1503 and the Bluetooth keyboard 1507 form a connection group. In the connection tables 1505 and 1509 (as shown in FIG. 16) of the connection group formed by the Bluetooth mouse 1503 and the Bluetooth keyboard 1507, three elementary attribute parameters of the Bluetooth mouse 1503 and the Bluetooth keyboard 1507 are recorded, namely: connection address, application connection type and role in the connection group. In this example, the connection address of the Bluetooth mouse 1503 is "00:OE:6D:70:F0:BA", the application connection type is "HID", and the role is "Device"; the connection address of the Bluetooth keyboard 1507 is "00:11:60:54:C1:80", the application connection type is "HID", and the role is "Device".

The PC 1500 establishes/disconnects a connection with a Bluetooth module 1506 of the Bluetooth mouse 1503 via a Bluetooth module 1502, then a managing module 1504 of the Bluetooth mouse 1503 records the Bluetooth address of the PC 1500, and establishes a Bluetooth HID connection with the Bluetooth keyboard 1507 according to the address "00:11:60:54:C1:80" of the Bluetooth keyboard 1507 recorded in the connection table 1505, and notifies the Bluetooth address of the PC 1500 to the Bluetooth keyboard 1507, requests the Bluetooth keyboard 1507 to establish/disconnect a Bluetooth connection with the PC 1500. If the Bluetooth keyboard 1507 accepts the request, the Bluetooth keyboard 1507 automatically establishes/disconnects a Bluetooth HID connection with the PC 1500 according to the Bluetooth address of the PC 1500. Likewise, after the PC 1500 first establishes/disconnects a Bluetooth HID connection with the Bluetooth keyboard 1507, the Bluetooth keyboard 1507 may as well enable the Bluetooth mouse 1503 to automatically establish/disconnect a Bluetooth HID connection with the PC 1500 through requesting the Bluetooth mouse 1503.

Figures 17, 18:
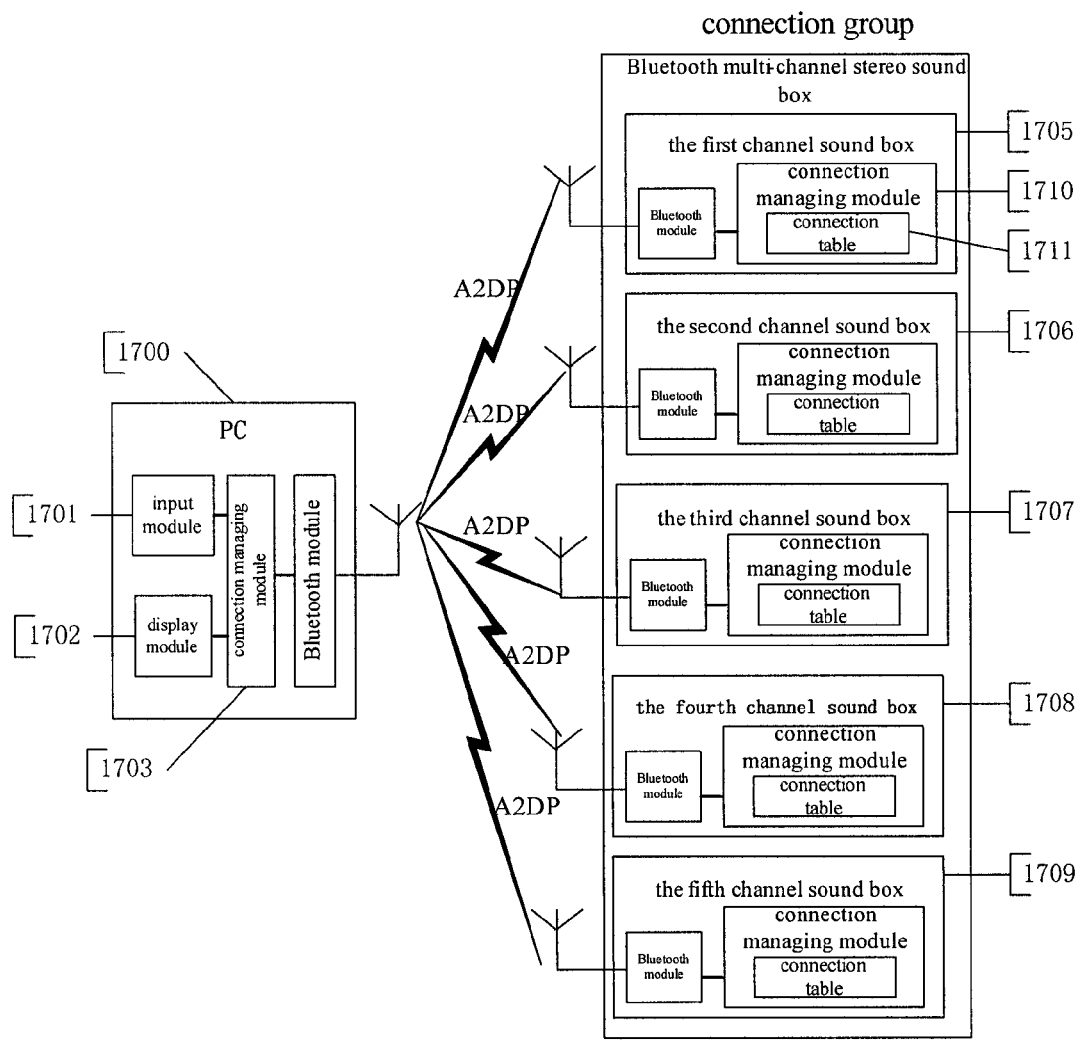
FIG. 17 is a structural diagram of a system wherein the connection group formed by a Bluetooth 5-channel sound box establishes and disconnects several wireless connections with PC.
FIG. 18 is a connection table of the connection group formed by the Bluetooth 5-channel sound box in FIG. 17.

Specific Embodiment III the connection group formed by a Bluetooth 5-channel sound box automatically establishes and disconnects several wireless connections with the PC (see FIGS. 17-18).

FIG. 17 is a structural diagram of a system wherein the connection group formed by a Bluetooth 5-channel sound box establishes and disconnects several wireless connections with a PC 1700.

A Bluetooth 5-channel sound box is usually a product produced by one manufacturer and used in cooperation, therefore, it is allowable to set connection group attribute parameters for a Bluetooth 5-channel sound box when it leaves the factory, including a group type and connection parameters (such as Bluetooth address, application connection type and role) in the connection group corresponding to said group type. It is preferable to set the group type of a Bluetooth 5-channel sound box as sound box connection group, the application connection type of respective channel sound box in the connection group is "A2DP", and the role is "SNK".

When a Bluetooth 5-channel sound box is firstly adopted, a connection table of the connection group is configured by a first-channel sound box 1705 according to the principle of the group type. Specifically, the first-channel sound box 1705 looks up the peripheral Bluetooth devices and inquires the group type parameters, the first-channel sound box 1705 also selects, from the Bluetooth devices which return the group type parameters, a second-channel sound box 1706, a third-channel sound box 1707, a fourth-channel sound box 1708 and a fifth-channel sound box 1709 which belong to the sound box connection group as itself, to form a connection group, acquires the connection group attribute parameters of itself and the second-channel sound box 1706, the third-channel sound box 1707, the fourth-channel sound box 1708 and the fifth-channel sound box 1709 and adds them to a connection table 1711, and stores the connection table 1711 in a connection managing module 1710. The connection table 1711 may be further transmitted to the second-channel sound box 1706, the third-channel sound box 1707, the fourth-channel sound box 1708 and the fifth-channel sound box 1709, and stored in their connection managing modules respectively.

If the Bluetooth 5-channel sound box is not set with the group type parameters when it leaves the factory, it is also allowable to configure a connection table via an input module 1701 and a display module 1702 of the PC 1700 so as to store the connection group attribute parameters of the Bluetooth 5-channel sound box connection group, and then the PC 1700 transmits said connection group attribute parameters to the first-channel sound box 1705, the second-channel sound box 1706, the third-channel sound box 1707, the fourth-channel sound box 1708 and the fifth-channel sound box 1709 of the Bluetooth 5-channel sound box.

The connection table of the Bluetooth 5-channel sound box connection group records, as shown in FIG. 18, three attribute parameters of the first-channel sound box 1705, the second-channel sound box 1706, the third-channel sound box 1707, the fourth-channel sound box 1708 and the fifth-channel sound box 1709, namely the connection address, the application connection type and role in the connection group.

Therefore, if the PC 1700 establishes/disconnects with one of the Bluetooth 5-channel sound box an A2DP connection in which said channel sound box serves as an SNK role, the PC 1700 automatically establishes/disconnects with other channel sound boxes an A2DP connection in which other channel sound boxes serve as SNK roles according to other connection parameters included in the connection group attribute parameters of the Bluetooth 5-channel sound box connection group.

Although the present invention is illustrated and described with reference to its preferable embodiments, those ordinarily skilled in the art shall understand that various changes in form and detail are allowable in the case of not deviating from the spirit and the scope of the invention defined in the appended Claims.

The invention claimed is:

1. A method for supporting automatically establishing or disconnecting several wireless connections between a plurality of group wireless devices and a third party wireless device, comprising the steps of:

forming a connection group by a group first wireless device and a plurality of other group wireless devices;

configuring a connection table to record connection group attribute parameters for the connection group, the connection group attribute parameters including connection parameters of said group first wireless device and other plurality of group wireless devices;

the group first wireless device in the connection group establishing/disconnecting a wireless connection with the third party wireless device;

if the wireless connection has the connection parameters of said group first wireless device as specified by the connection table in the connection group, then automatically establishing/disconnecting a corresponding wireless connection between the third party wireless device and other group wireless devices in said connection group according to other connection parameters included in the connection group attribute parameters of said connection group.

2. The method as recited in claim 1, wherein the connection table is configured by the group first wireless device, and the configuring step comprises the steps of:

selecting, on the group first wireless device, one or more wireless devices from peripheral wireless devices as looked up as other group wireless devices to form a certain connection group with the group first wireless device;

the group first wireless device configuring a connection table and adding the connection parameters supported by itself, that are going to be applied in the connection group, into the connection group attribute parameters of the connection group;

the group first wireless device inquiring other group wireless devices in the connection group to acquire their supported connection parameters, wherein only the connection parameters that are going to be applied in the connection group are added into the connection group attribute parameters of the connection group.

3. The method as recited in claim 2, wherein the step of selecting wireless devices can be performed automatically by the group first wireless device according to a group type criteria criterion, or implemented through interacting with users.

4. The method as recited in claim 2, wherein the step of adding the connection parameters comprises: the group first wireless device acquiring, according to a group type criterion, connection parameters supported by said other group wireless devices in the corresponding connection group as the added connection parameters, or selecting the connection parameters to be added through interacting with users.

5. The method as recited in one of claims 2-4, wherein the group first wireless device transmits the connection group attribute parameters in the configured connection table to other group wireless devices in the corresponding connection group so as to store said connection group attribute parameters in their connection tables.

6. The method as recited in claim 5, wherein when the group first wireless device storing a connection table or the other group wireless devices establish(es)/disconnect(s) a connection with the third party wireless device, the method further including the step of the group first wireless device or other group wireless devices determining whether the third party wireless device has a connection group managing function; and the step of automatically establishing/disconnecting a corresponding wireless connection between the third party wireless device and the corresponding group wireless devices in said connection group comprises:
   if the result of the determining step is "yes", the group first wireless device or other group wireless device transmitting the stored connection table to the third party wireless device, and then the third party wireless device implementing said automatic establishing/disconnecting according to the connection group attribute parameters of the connection table;
   otherwise, the group first wireless device or other group wireless devices requesting to implement said automatic establishing/disconnecting according to the connection group attribute parameters in the connection table.

7. The method as recited in claim 6, wherein the third party wireless device further configures the connection table after receiving it, comprising:
   the third party wireless device selecting one or more wireless devices from the peripheral wireless devices as looked up which are of different wireless connection type from the established connection to add into the connection group, and inquiring the selected one or more wireless devices to acquire the supported connection parameters;
   the third party wireless device selecting connection parameters of the one or more wireless devices to be applied in the corresponding connection group automatically or through interacting with users, and adding said connection parameters into the connection group attribute parameters in the corresponding connection group.

8. The method as recited in claim 1, wherein the connection table is configured by the third party wireless device, and the configuring step comprises the steps of:
   the third party wireless device selecting, from the peripheral wireless devices as looked up, one or more wireless devices as group wireless devices through interacting with users to form a certain connection group;
   the third party wireless device inquiring said group wireless devices to acquire their supported connection parameters, and adding, through interacting with users, the connection parameters to be applied in the connection group into the connection group attribute parameters of the connection group to configure a connection table;
   and transmitting the configured connection table to one or more group wireless devices in the connection group.

9. The method as recited in claim 8, wherein the step of automatically establishing/disconnecting a corresponding wireless connection between the third party wireless device and the corresponding group wireless devices in said connection group comprises:
   the third party wireless device looking up, in the connection table stored by itself, the connection group attribute parameters including connection parameters of the wireless connections as established/disconnected, and establishing/disconnecting in turn the wireless connections with other group wireless devices according to other connection parameters included in the connection group attribute parameters.

10. The method as recited in claim 1, wherein said connection parameters comprise a connection address, application connection type and role of group wireless devices.

11. The method as recited in claim 10, wherein said connection parameters further comprise a wireless connection type.

12. The method as recited in claim 11, wherein said wireless connection type comprises Bluetooth, WiFi, Wibree, wireless USB or UWB.

13. A group first wireless device for supporting automatically establishing and disconnecting several wireless connections with a third party wireless device, comprising:
   a wireless module for making wireless connections with other wireless devices;
   a connection managing module for communicating with other wireless devices via the wireless module so as to manage several connections between the wireless devices and the third party wireless device, the connection managing module comprising:
   a group wireless device selecting part for looking up peripheral wireless devices and selecting one or more wireless devices therein as other group wireless devices so as to form a certain connection group together with the group first wireless device;
   a connection parameter acquiring part for inquiring the selected other group wireless devices to acquire their supported connection parameters;
   a connection table configuring part for storing a connection table to record connection group attribute parameters for the connection group formed by the group first wireless device, and arranged to add self-supported connection parameters that are going to be applied in the connection group into the connection group attribute parameters of the connection group, and add the connection parameters to be applied in the connection group among the acquired connection parameters of other group wireless devices to the connection group attribute parameters of the connection group to configure the connection table.

14. The group first wireless device as recited in claim 13, wherein the group wireless device selecting part automatically performs according to a group type criterion, or implements the selection of the wireless devices through interacting with users.

15. The group first wireless device as recited in claim 13, wherein the connection table configuring part acquires, according to the group type criteria, the connection parameters supported by said other group wireless devices in corresponding connection groups as the added connection parameters, or selecting the connection parameters to be added through interacting with users.

16. The group first wireless device as recited in claim 13, wherein the connection managing module transmits, via a wireless module, connection group attribute parameters in the configured connection table to other group wireless devices in the corresponding connection group so as to store said connection group attribute parameters in their connection tables.

17. The group first wireless device as recited in claim 13 or 16, wherein, when the group first wireless device establishes/disconnects a connection with the third party wireless device, the connection managing module determines whether the third party wireless device has a connection group managing function:
   if the result of the determining step is "yes", the connection managing module transmitting the stored connection table to the third party wireless device, and the third party wireless device implementing said automatic establishing/disconnecting according to the connection group attribute parameters in the connection table;
   otherwise, the group first wireless device requesting to implement said automatic establishing/disconnecting according to the connection group attribute parameters in its connection table.

18. A system for supporting automatically establishing and disconnecting several wireless connections, said system comprising a third party wireless device, a group first wireless device as recited in claim 13 and other group wireless devices.

* * * * *